Aug. 14, 1962    R. VAHLE    3,049,060
CARTON DISPENSER
Filed Jan. 18, 1960    19 Sheets-Sheet 1
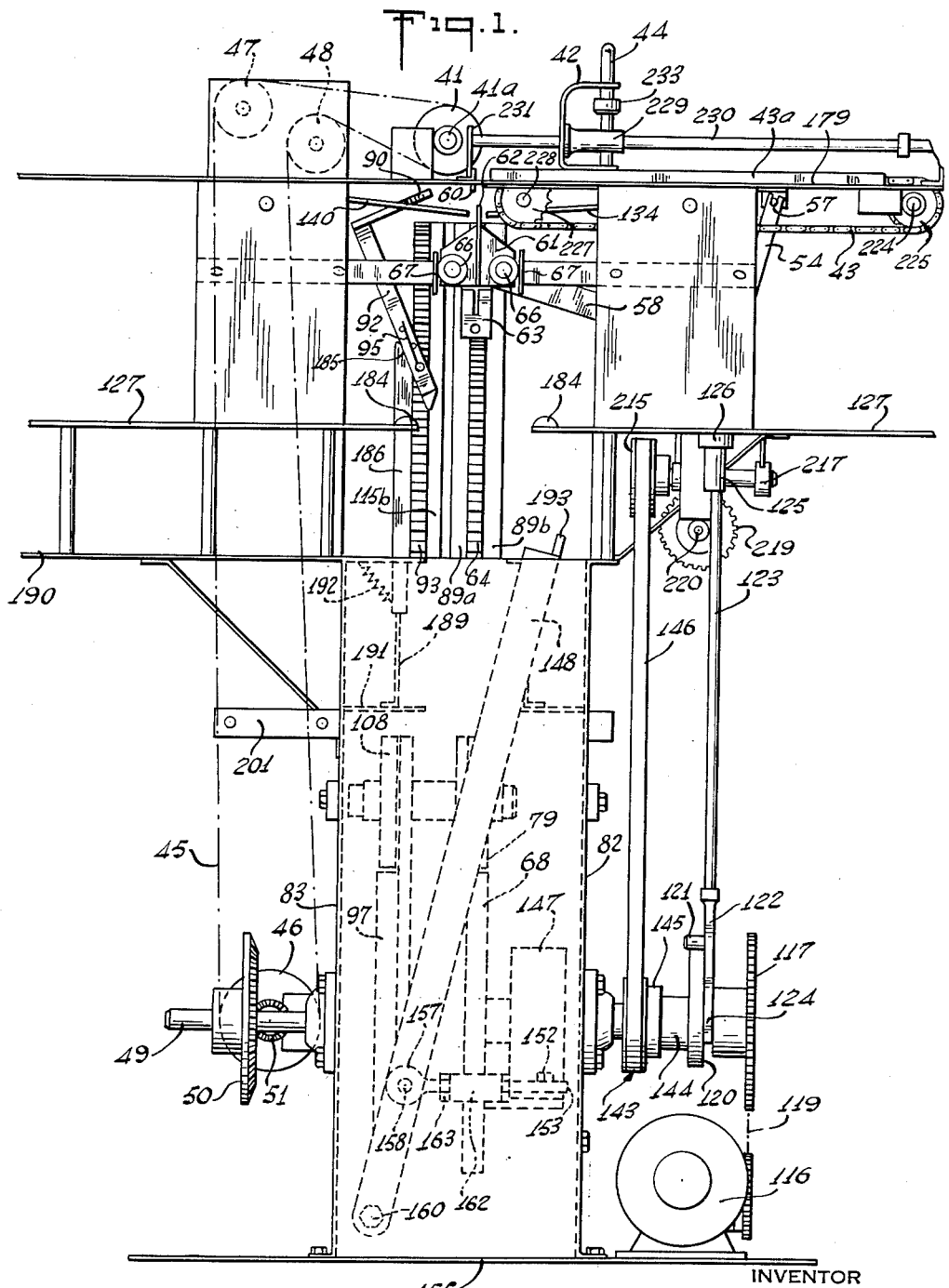
INVENTOR
RAYMOND VAHLE
BY
Robertson & Smythe
ATTORNEYS

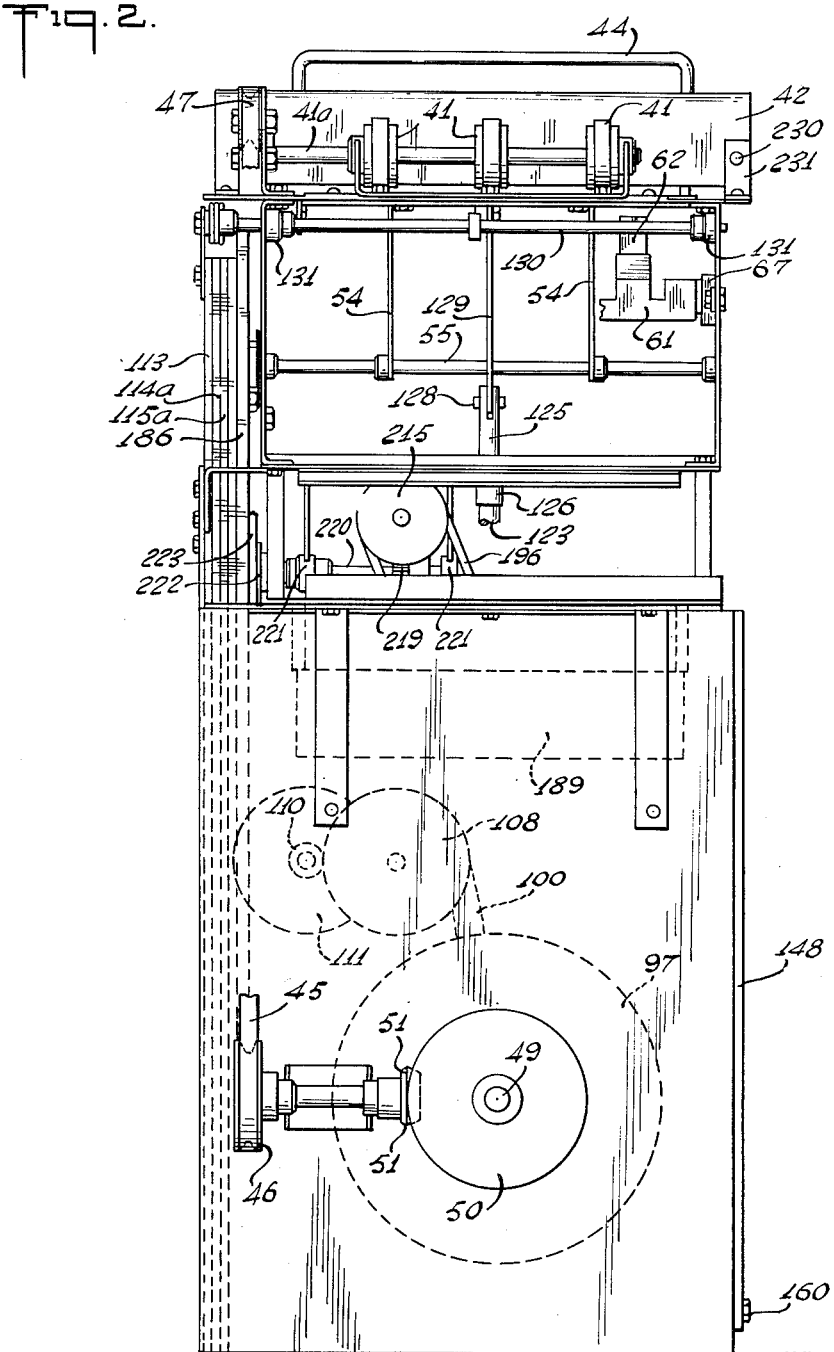

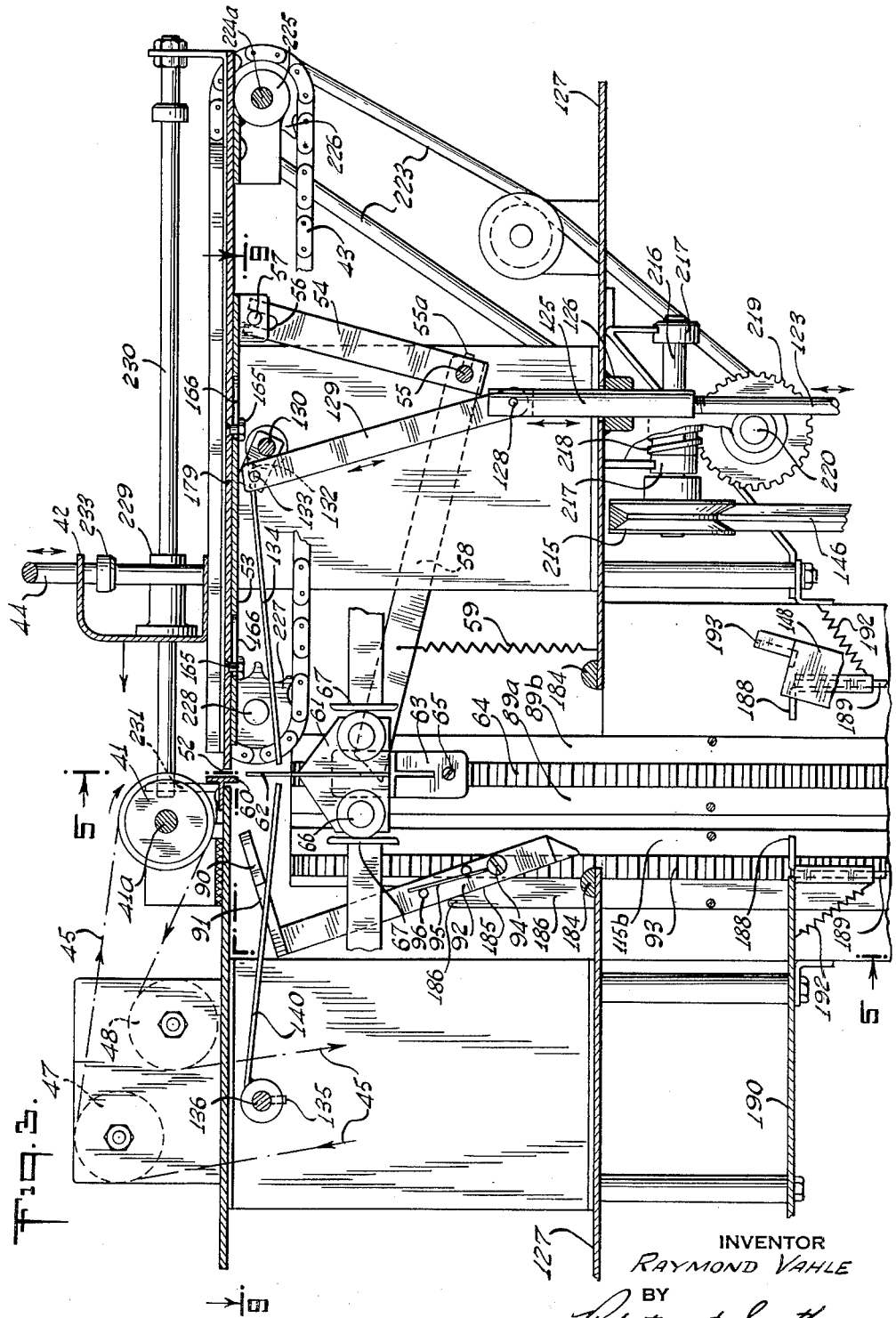

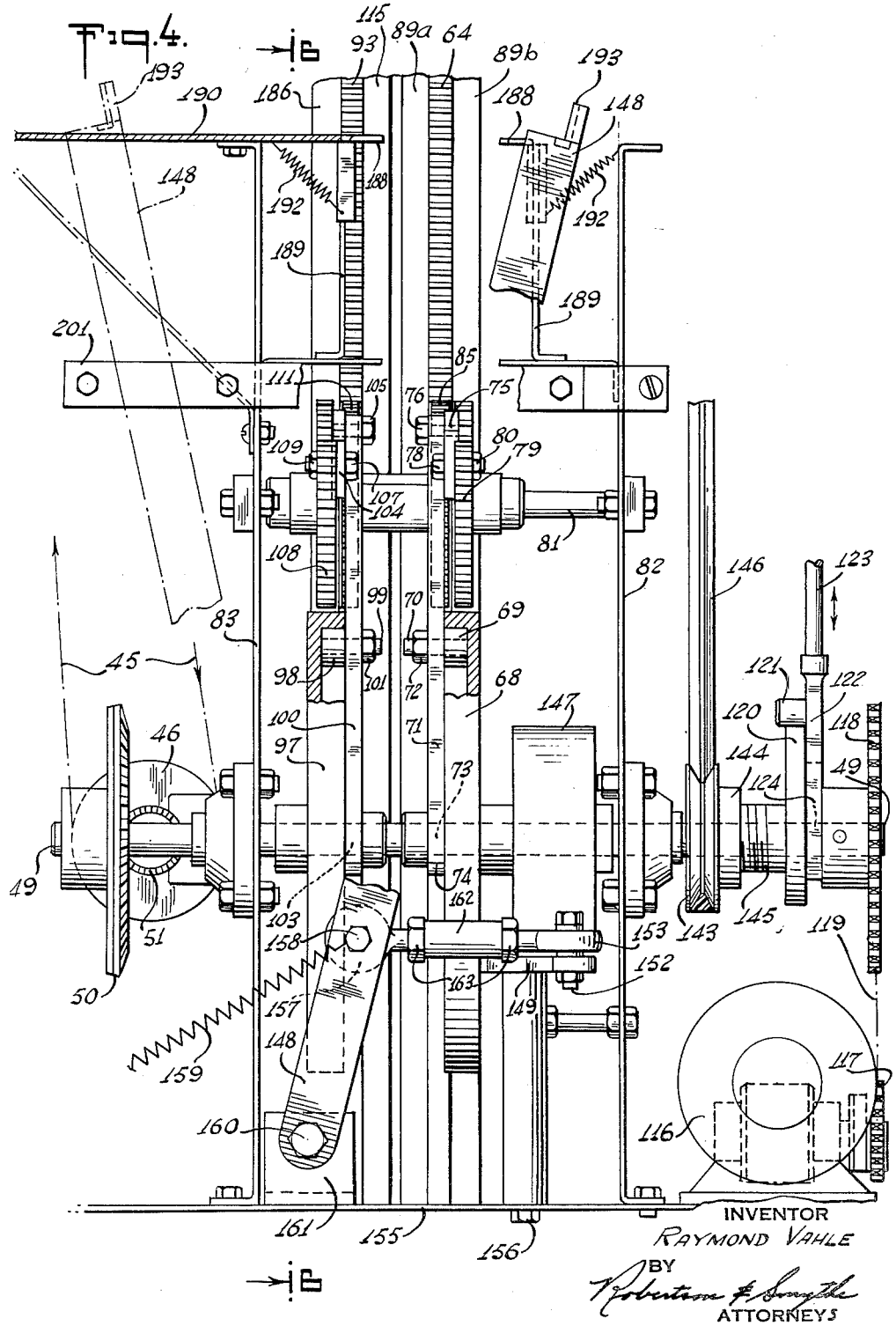

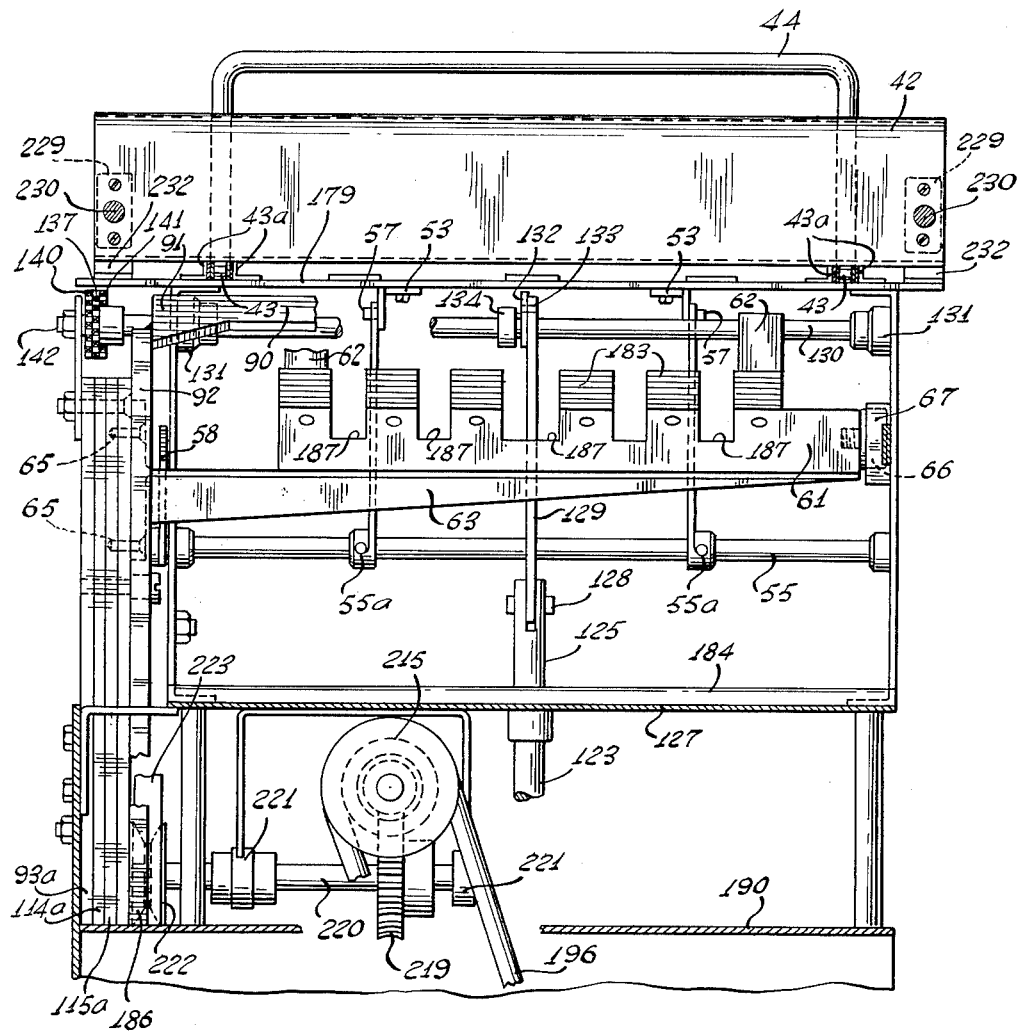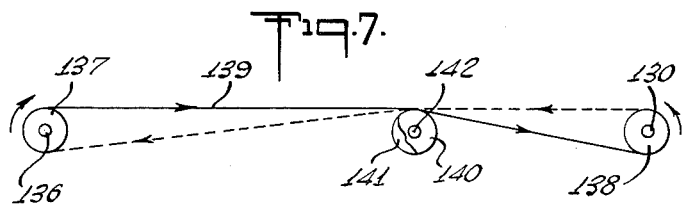

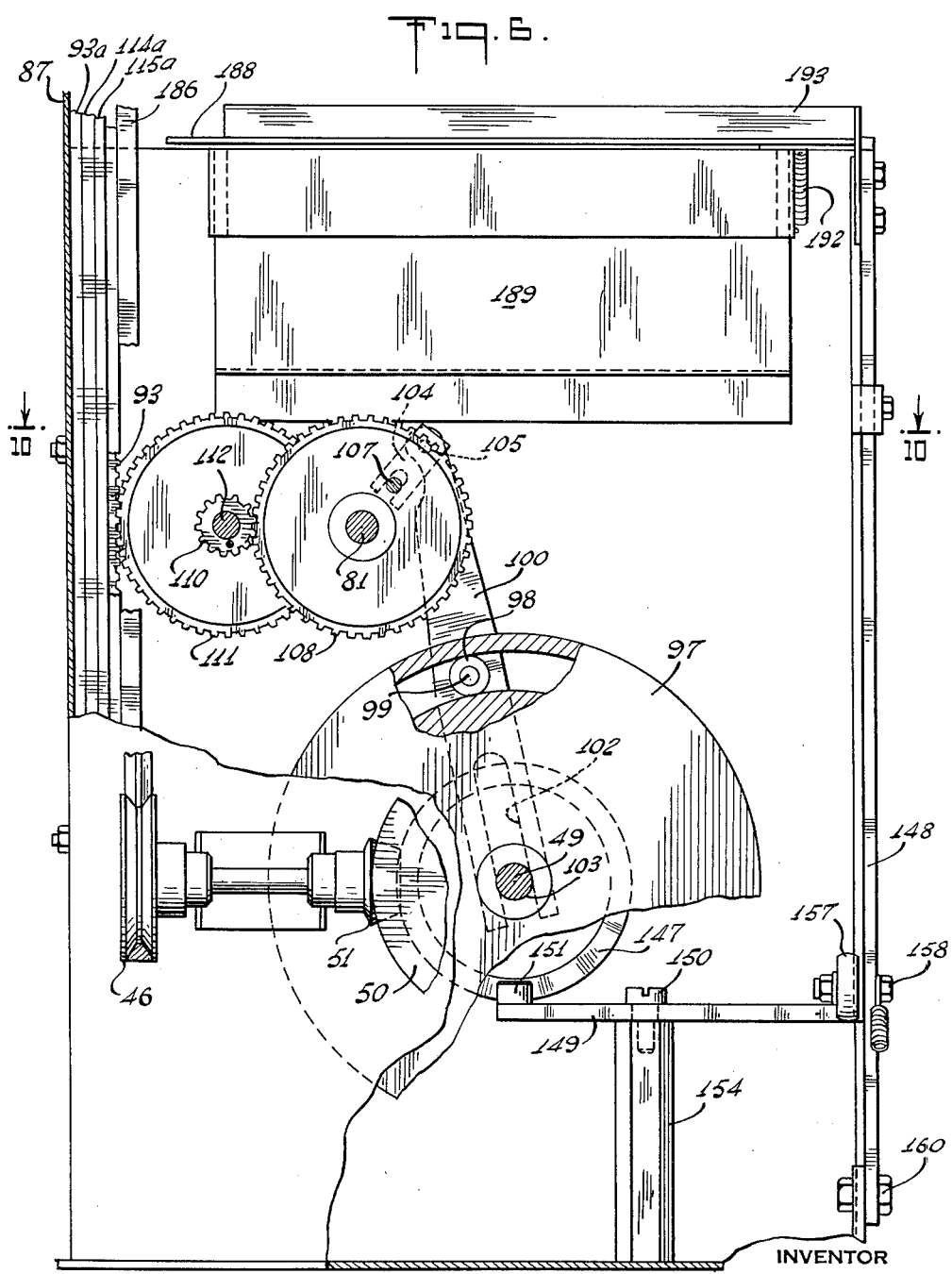

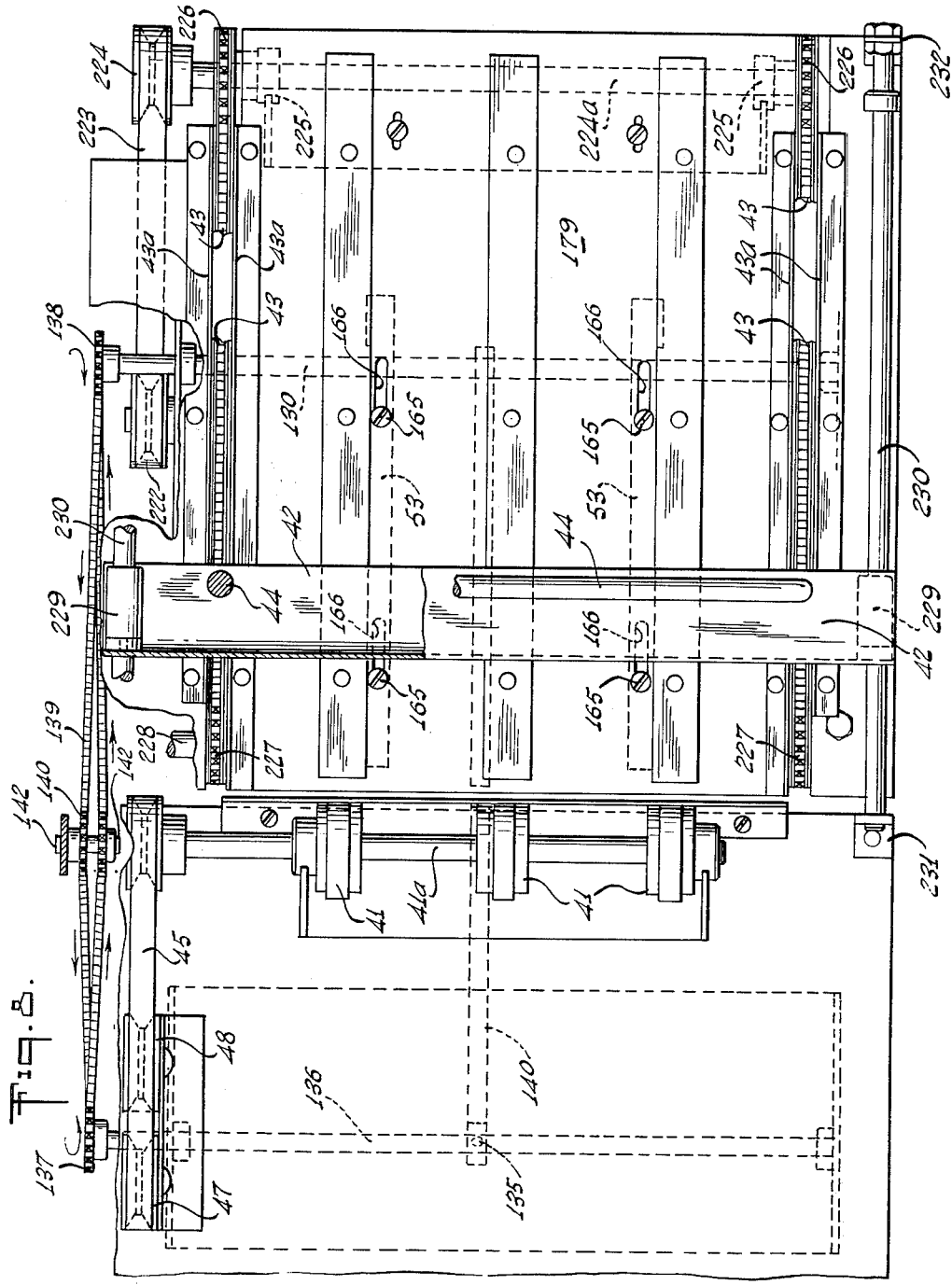

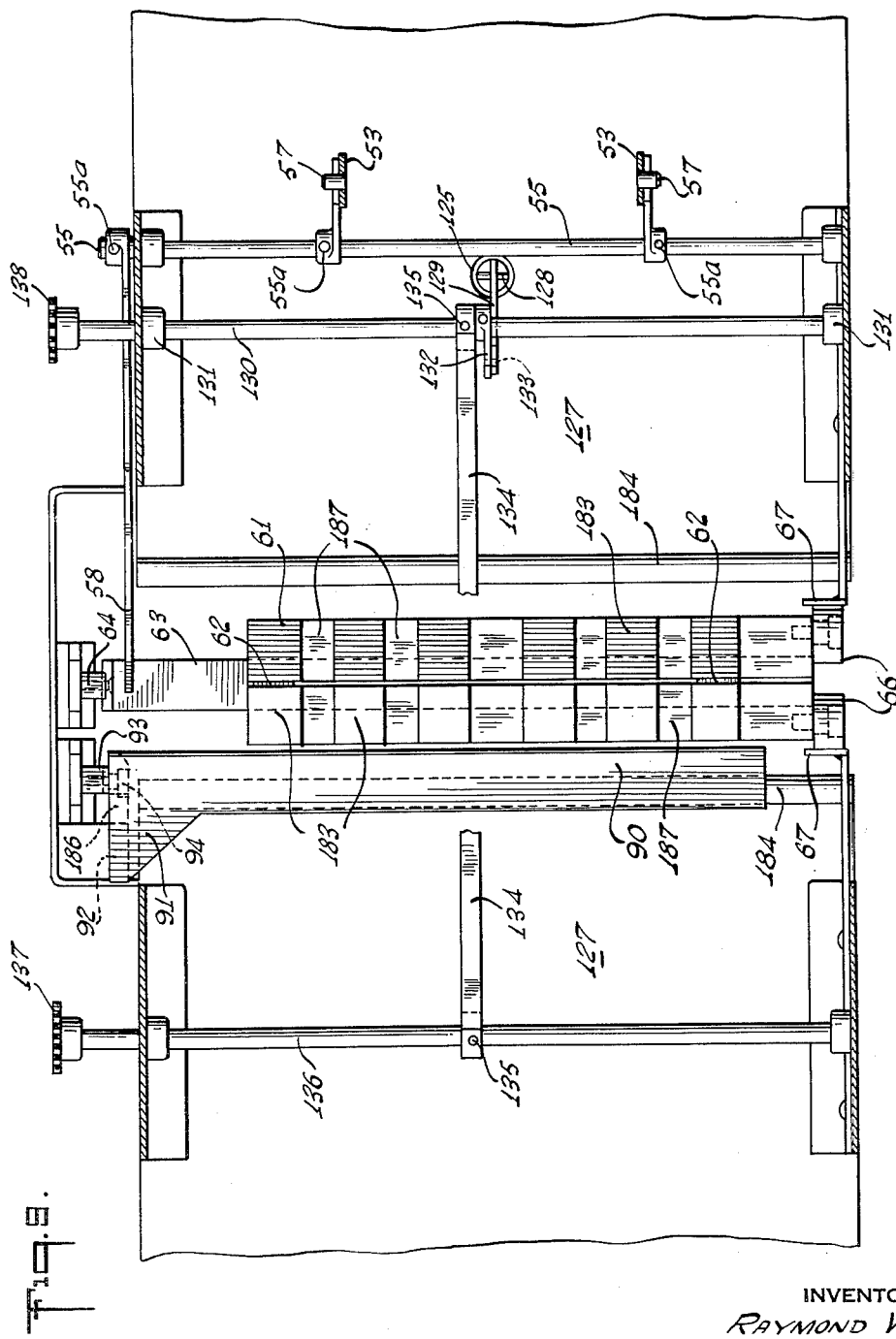

Aug. 14, 1962  R. VAHLE  3,049,060
CARTON DISPENSER
Filed Jan. 18, 1960  19 Sheets-Sheet 9
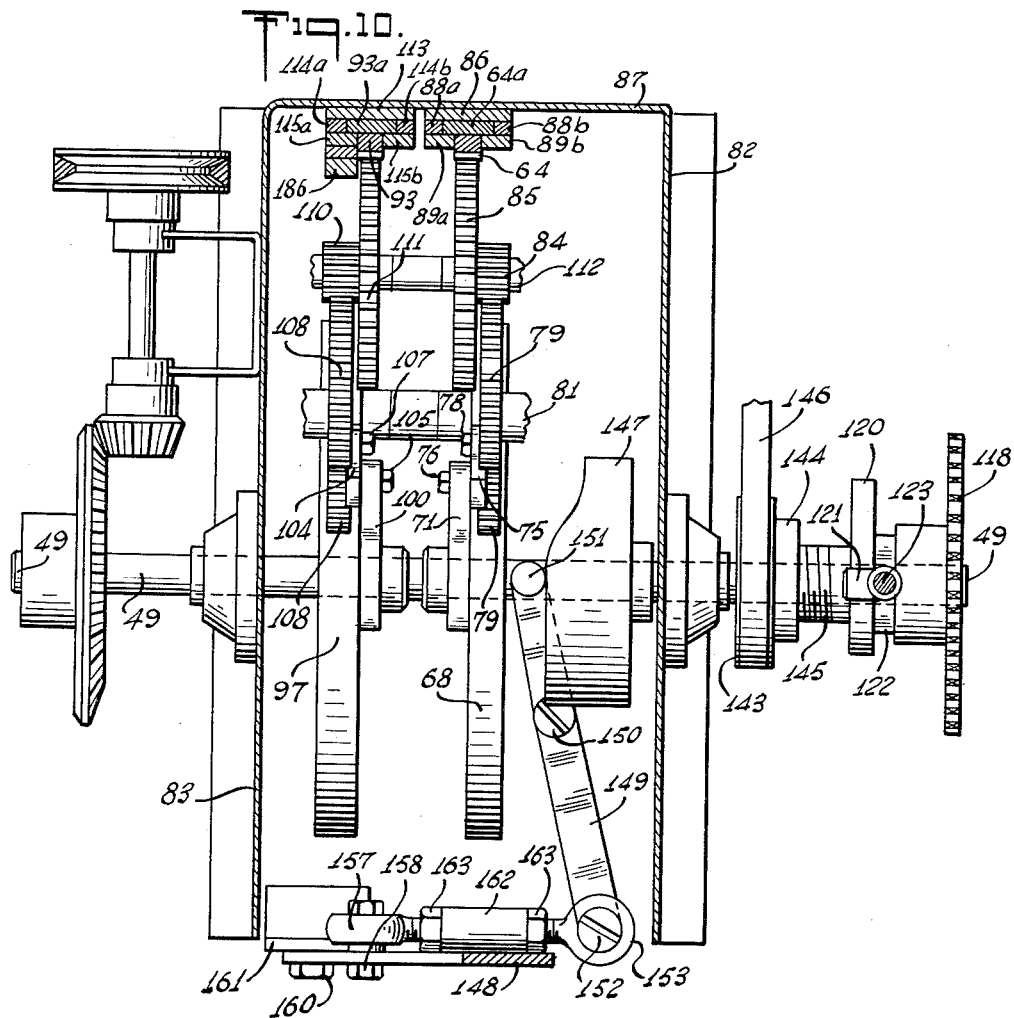
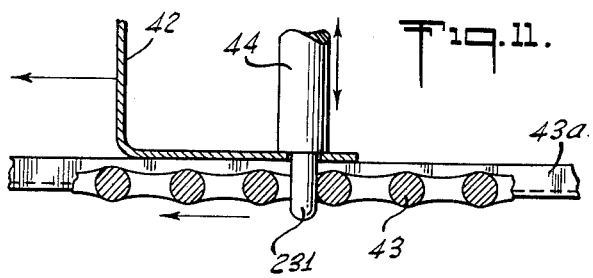
INVENTOR
RAYMOND VAHLE
BY
ATTORNEYS

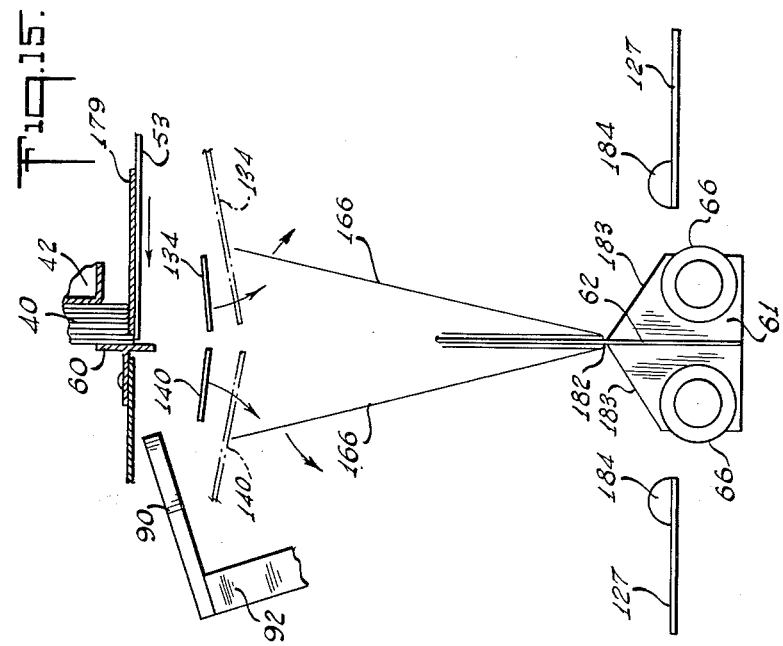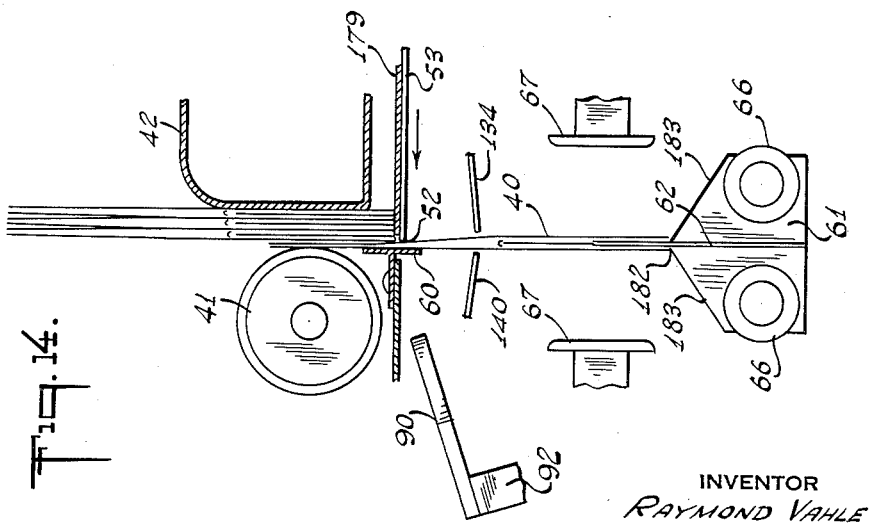

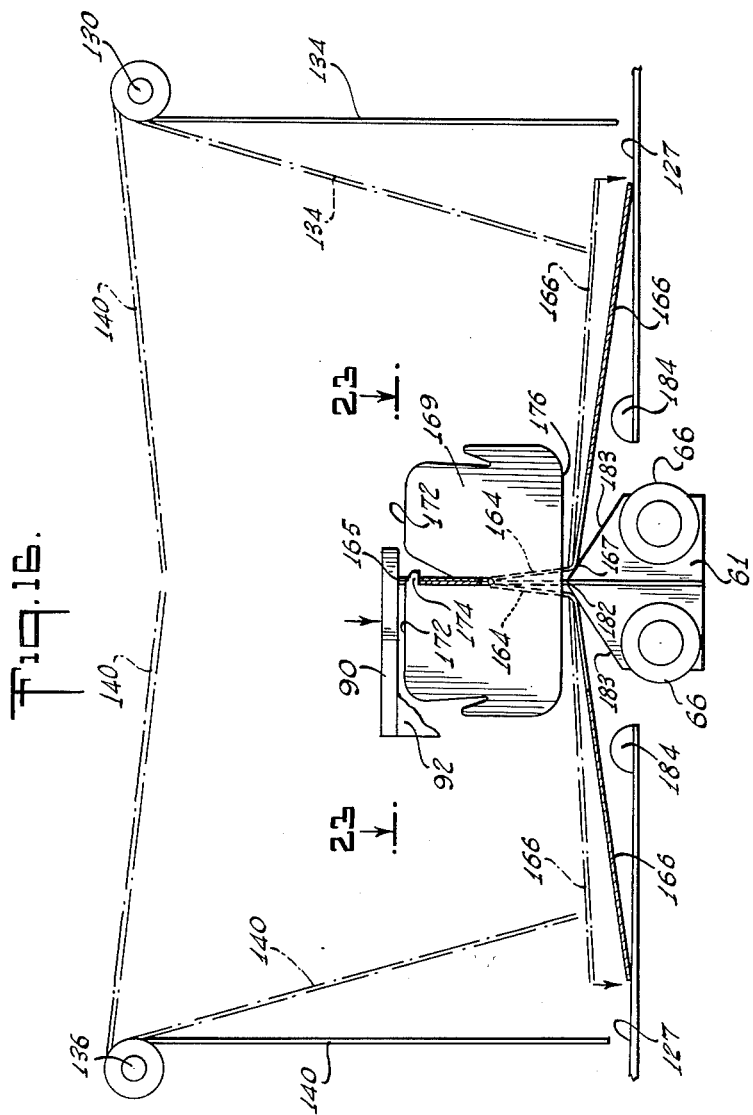

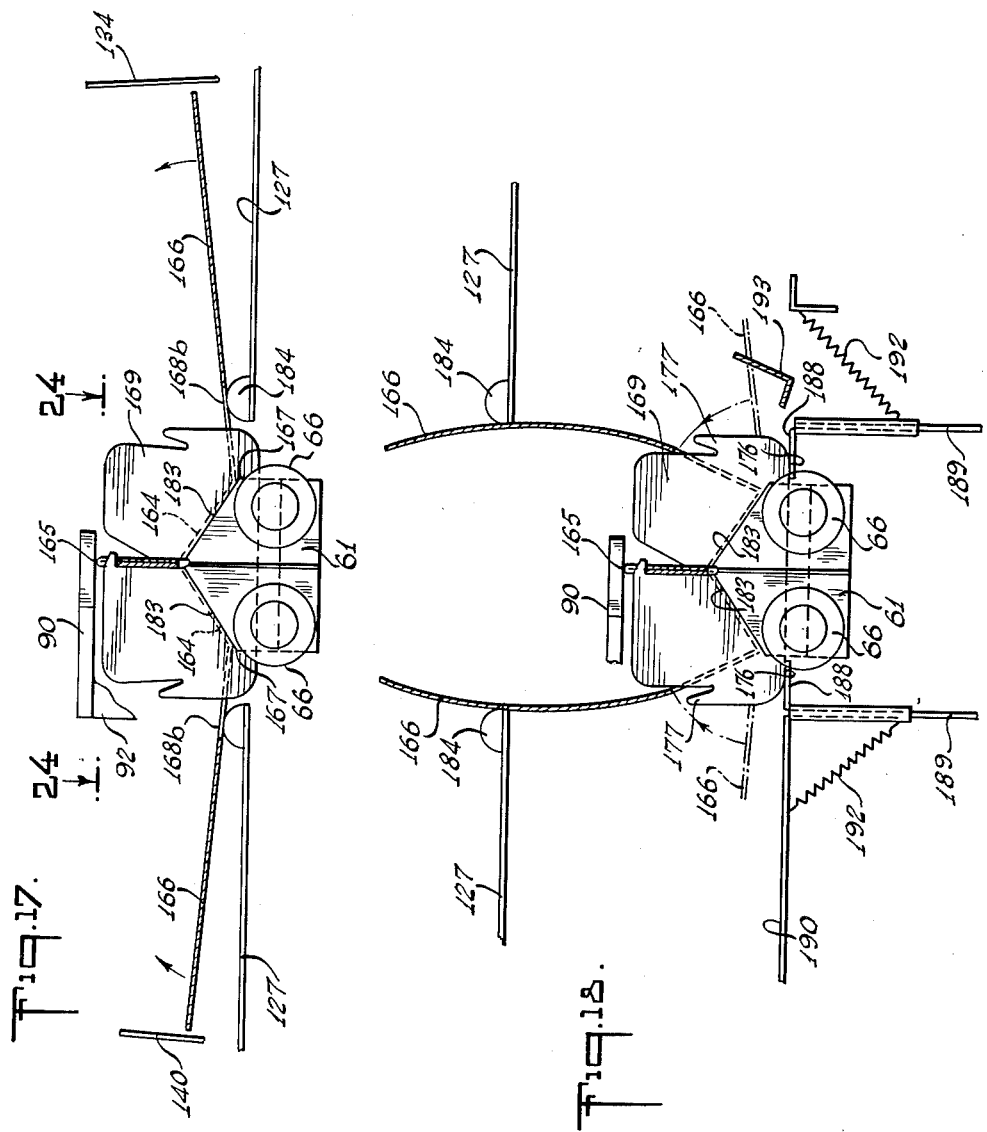

Aug. 14, 1962   R. VAHLE   3,049,060
CARTON DISPENSER
Filed Jan. 18, 1960   19 Sheets-Sheet 14
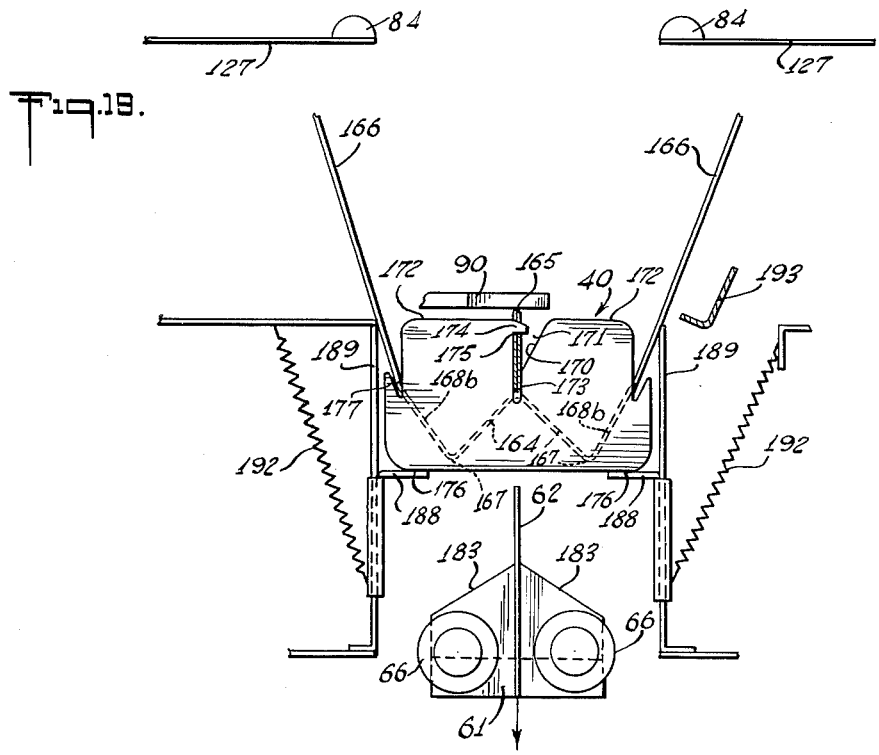
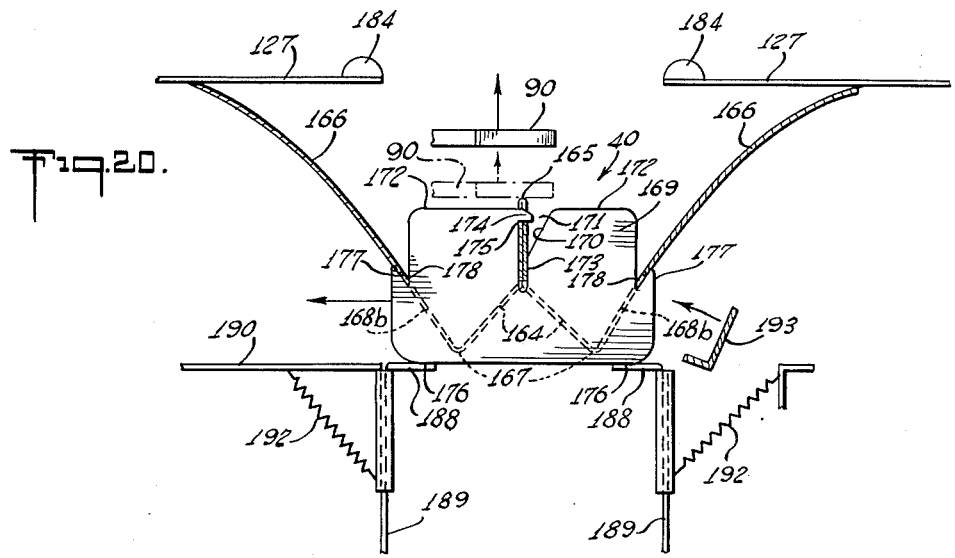
INVENTOR
RAYMOND VAHLE
BY
ATTORNEYS

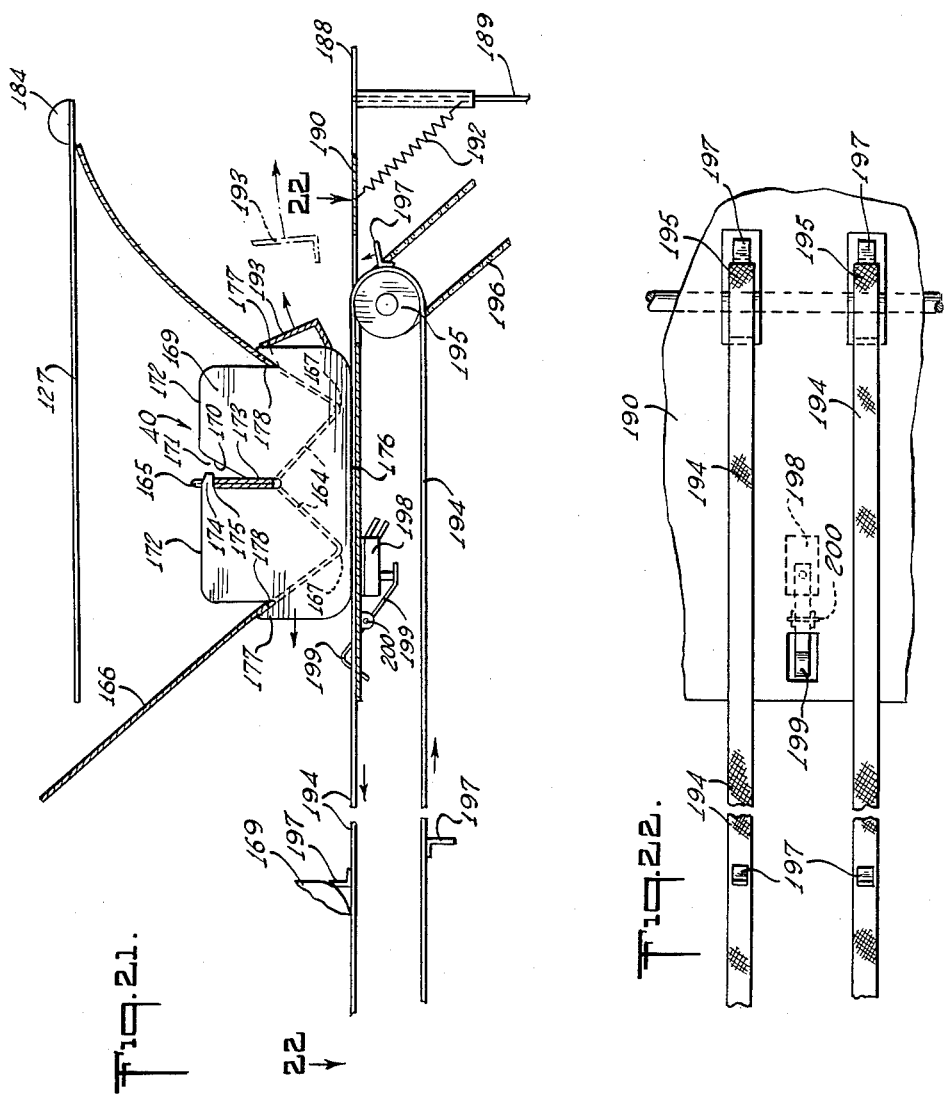

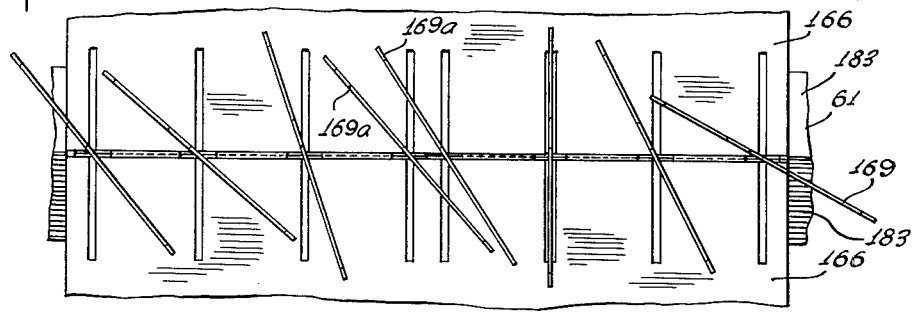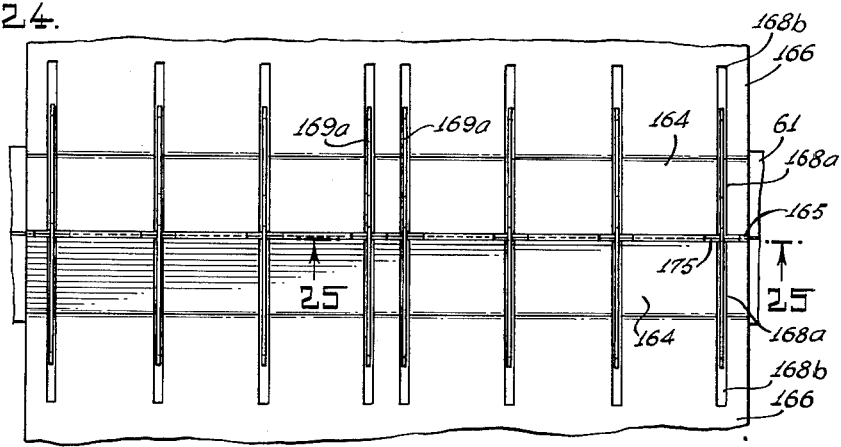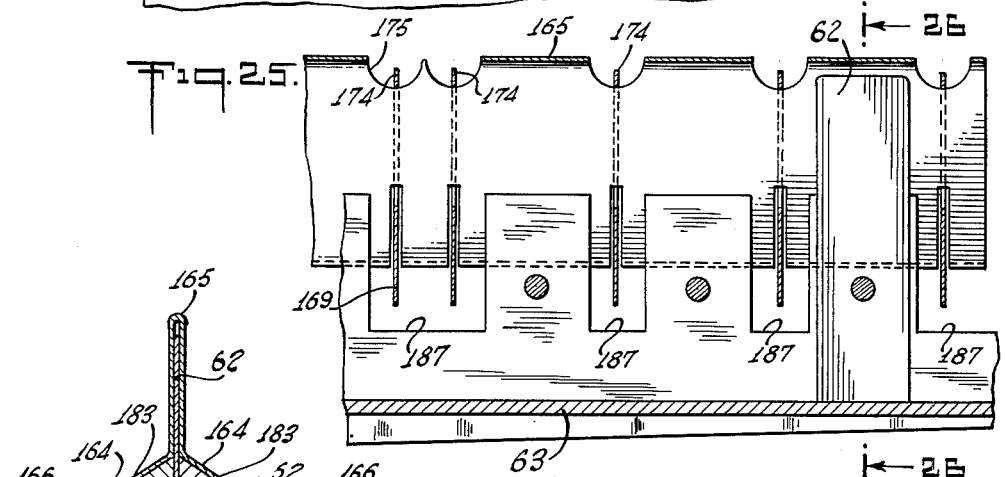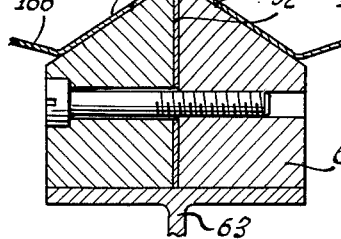

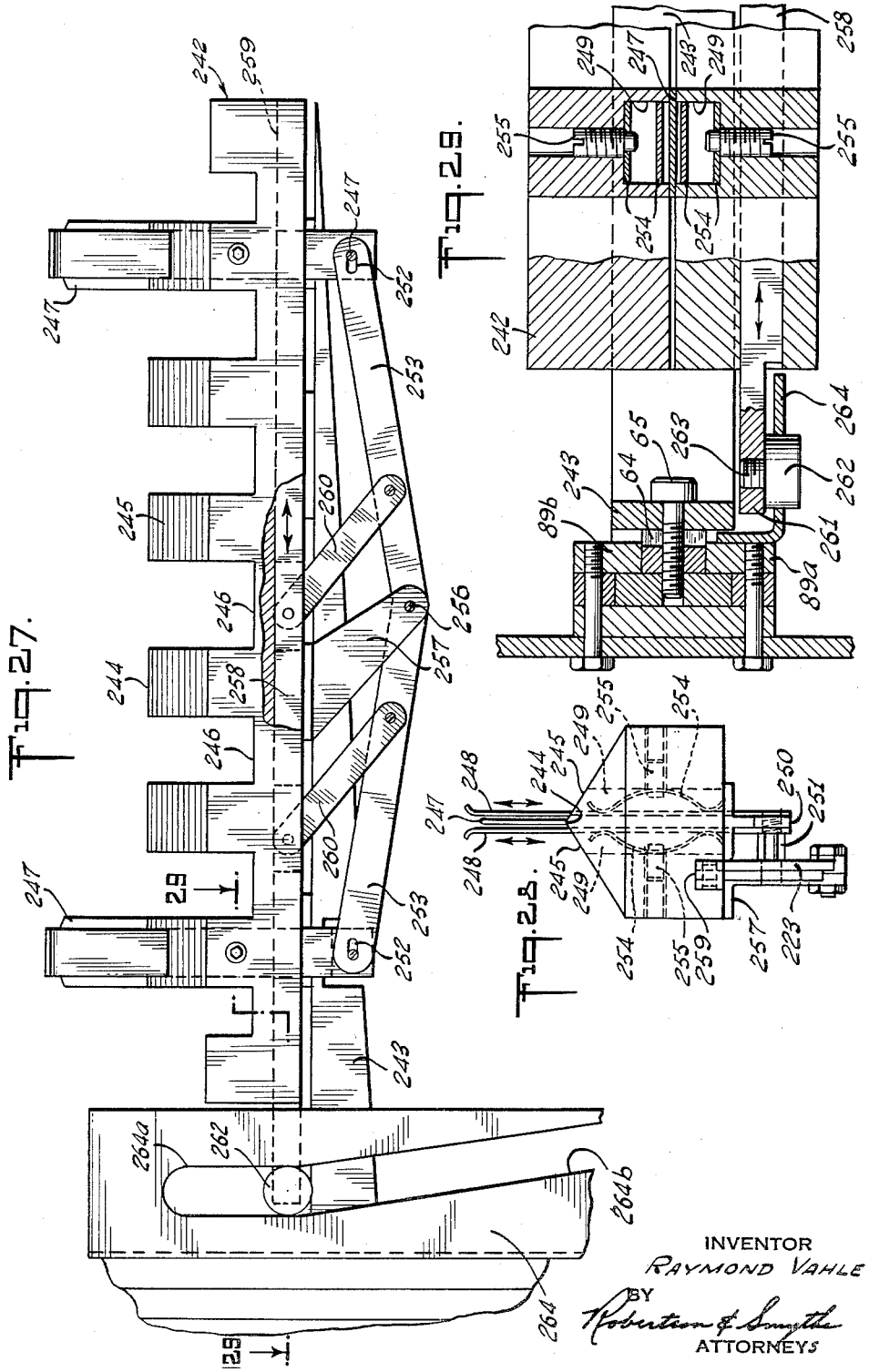

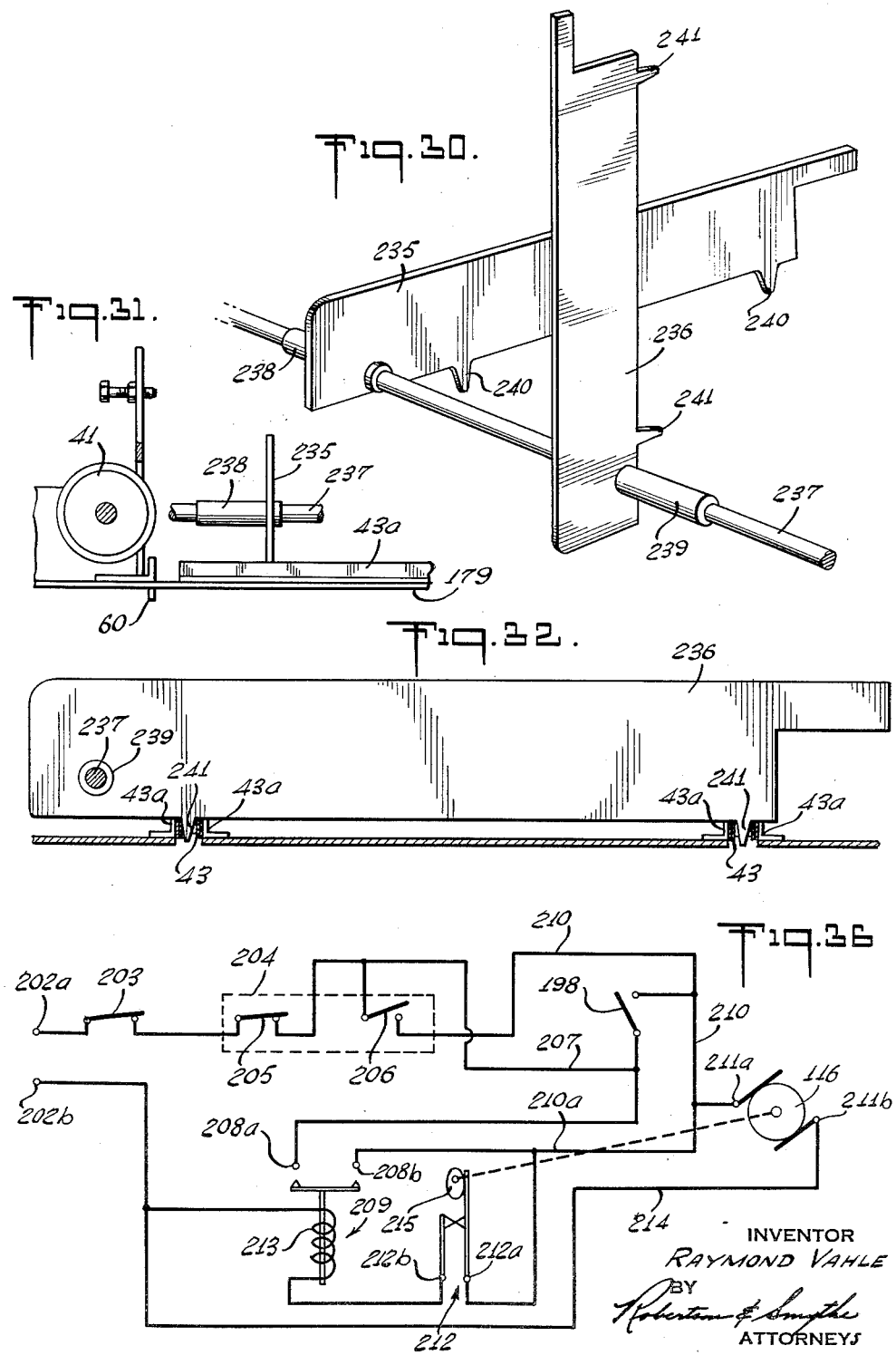

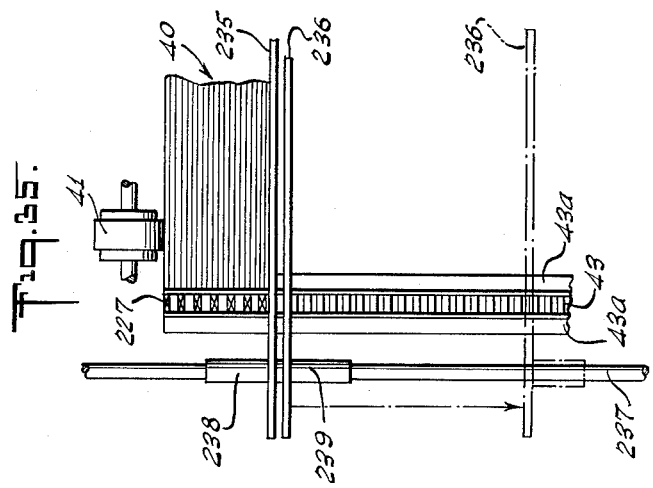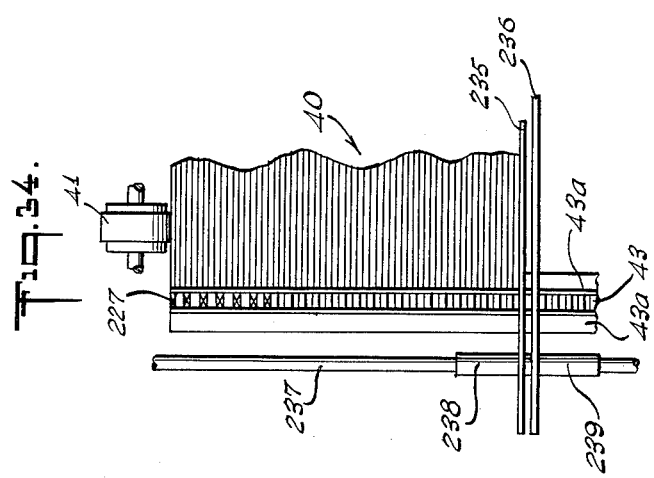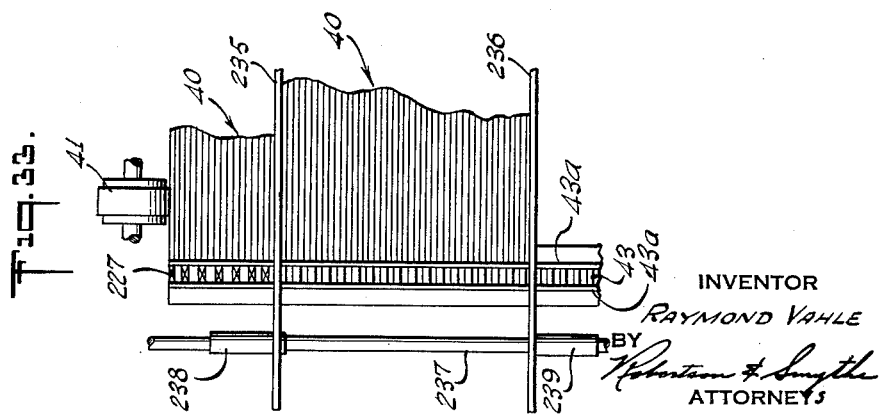

United States Patent Office 3,049,060
Patented Aug. 14, 1962

3,049,060
CARTON DISPENSER
Raymond Vahle, Tappan, N.Y., assignor to Continental Can Company, Inc., New York, N.Y., a corporation of New York
Filed Jan. 18, 1960, Ser. No. 3,048
45 Claims. (Cl. 93—37)

The invention relates to the erection of a flat folded paperboard carton.

My invention has special application to use with the paperboard carton of the type disclosed in U.S. Patent No. 1,768,023, granted June 24, 1930, to Leon Benoit. Such cartons have inner side walls extending from a center fold line to intermediate fold lines from which the outer side walls extend. In the flat folded form the outer side walls extend over the inner side walls. Both the inner and outer side walls contain transverse slots which are in register with each other. Cross partitions are hinged in the slots and lie flat between the inner and outer side walls.

In erecting the carton, the outer side walls are folded outwardly to free the cross partitions, the inner side walls are folded outwardly to position the cross partitions and the outer side walls are then folded inwardly to engage their slots with the cross partitions thereby completing the erection of the carton.

The cartons of the type described are used for the packaging of eggs. In moving eggs from the farm to the consumer market, the eggs are sent to egg plants where they are removed from bulk containers. The eggs may then be candled and made ready for final packaging. For large egg plants, high speed machines are available to erect the cartons on a steady flow basis. The carton blanks are pushed through the machine and are progressively erected. The delivery of erected cartons, due to the high rate of operation of the machine, exceeds the rate of consumption so that the erected cartons may be stockpiled at each station where the eggs are being packed.

The machine of my invention erects the cartons one at a time. Instead of a steady flow of cartons, it erects a single carton by a series of folding operations and delivers the erected carton before the erection of the next carton begins. Consequently, the machine might be said to be a carton dispenser, that is, it will erect one carton at a time upon demand. Since the machine is not a steady flow device, it requires a minimum of floor space requirements. Its dispenser feature of erecting a carton on demand, eliminates storage and handling of erected cartons. The machine may be placed near the location where the eggs are packed so that each packer may remove an erected carton directly from the machine as required. The machine then immediately prepares the next carton. Where the packing operations are spread over a large area, a carton dispenser may be provided to service each area.

Summary

In accordance with my invention a flat folded carton is individually introduced into the machine and subsequently erected by a series of folding operations. Upon the completion of the erection of the carton, the carton is ejected from the machine whereupon the machine operation ceases until it is desired that a subsequent carton be erected.

The carton blanks are introduced into the machine in flat folded form and are fed by a conveyor to a carton placing means. The placing means releases one carton at a time and forces it downwardly toward a separating means.

The separating means includes a mandrel having an upper ridge and sloping surfaces extending downwardly therefrom. Blade members project upwardly from the ridge. The carton being placed is impaled on the blade members and its intermediate fold lines come to rest against the mandrel ridge.

The means for outwardly folding the outer side walls outwardly about the intermediate fold lines includes parting arms which swing outwardly and force the carton outer side walls to a substantially flat position. At this point the cross partitions are released from restraint between the outer side walls and pivot in a random manner about their hinged mountings.

The means for urging the carton toward the separating means includes a pressure plate which moves against the carton center fold line and forces the inner side walls to be separated by the sloping surfaces of the mandrel. During the positioning of the inner side walls, their slots swing the cross partitions so that they are substantially at right angles to the center line. In this way, the cross partitions are brought into alignment with the slots in the outer side walls.

The means for folding the outer side walls inwardly include folding bars which are disposed at an interval from one another and substantially parallel to the center fold line. During the return movement of the carton with respect to the folding bars, the outer side walls are folded outwardly.

The means for supporting the carton through engagement with the cross partitions includes spring restrained platforms upon which the carton is forced by the pressure plate. With the carton so supported the mandrel may be withdrawn from beneath the carton. Upon moving the carton upwardly, the slots in the outer side walls are seated with respect to the cross partitions. At this point, the carton erection is completed and the carton may be withdrawn from the platforms to the exit station of the machine.

Other features and advantages of my invention will appear as the description proceeds.

Description

In the drawings I have illustrated the machine to show the best mode contemplated by me for carrying out my invention as applied to the erection of a flat folded paperboard carton.

FIG. 1 is a front elevational view of the machine.

FIG. 2 is a side elevational view of the machine.

FIG. 3 is an enlarged fragmentary front elevational view of the upper portion of the machine, illustrating the feed wheels, the mandrel, the feeder gates, and the mandrels.

FIG. 4 is an enlarged fragmentary front elevational view of the lower portion of the machine, illustrating the drive to the machine.

FIG. 5 is an enlarged sectional view taken along the lines 5—5 of FIG. 3, illustrating the carton feeder and the mandrel and the carton ejector.

FIG. 6 is an enlarged sectional view taken along the line 6—6 of FIG. 4, illustrating the drive to the mandrel.

FIG. 7 is a schematic representation of the drive of the parting arms.

FIG. 8 is an enlarged plan view of the machine.

FIG. 9 is an enlarged sectional view taken along the line 9—9 of FIG. 3, illustrating the mandrel, the top pressure plate, and the parting arms.

FIG. 10 is an enlarged sectional view taken along the line 10—10 of FIG. 6, illustrating the drive to the mandrel, the top pressure plate, and the carton ejector.

FIG. 11 is a fragmentary front elevational view of the carton feeder.

FIG. 14 is an enlarged fragmentary sectional view illustrating the descent of the carton onto the mandrel.

FIG. 15 is an enlarged fragmentary sectional view illustrating the closure of the feeder gate and the initial movement of the parting arms.

FIG. 16 is an enlarged fragmentary sectional view illustrating the completion of the downward folding of the carton outer side walls and the descent of the top pressure plate.

FIG. 17 is an enlarged fragmentary sectional view illustrating that the descent of the top pressure plate urging the carton against the mandrel and the upward movement of the carton outer side walls.

FIG. 18 is an enlarged fragmentary sectional view illustrating the further descent of the mandrel and the completion of the upward folding of the carton outer side walls.

FIG. 19 is an enlarged fragmentary sectional view illustrating the withdrawal of the mandrel from engagement with the carton.

FIG. 20 is an enlarged fragmentary sectional view illustrating the withdrawal of the top pressure plate and the locking of the outer side wall slots with the locks of the transverse partitions.

FIG. 21 is an enlarged fragmentary sectional view illustrating the ejection of the carton to the exit portion of the machine.

FIG. 22 is an enlarged fragmentary sectional view taken along line 22—22 of FIG. 21 illustrating the exit conveyor.

FIG. 23 is an enlarged sectional view taken along the line 23—23 of FIG. 16, illustrating the position of the carton transverse partitions before the carton is erected by the mandrel.

FIG. 24 is an enlarged sectional view taken along the line 24—24 of FIG. 17, illustrating the alignment of the transverse partitions into the outer side wall slots.

FIG. 25 is an enlarged sectional view taken along the line 25—25 of FIG. 24, illustrating the entry of the transverse partitions into the side wall slots.

FIG. 26 is an enlarged sectional view taken along the line 26—26 of FIG. 25 illustrating the carton in contact with the blades and mandrel.

FIG. 27 is a side elevational view of a modified form of the mandrel having moving carton guides.

FIG. 28 is an enlarged front elevational view of the modified mandrel having moving carton guides.

FIG. 29 is an enlarged fragmentary sectional view taken along the line 29—29 of FIG. 27 illustrating the cam linkage of the modified mandrel.

FIG. 30 is an enlarged perspective view of a modified form of the carton pusher plates.

FIG. 31 is an enlarged fragmentary front elevational view of the feed wheels and a pusher plate.

FIG. 32 is an enlarged side elevational view of the pusher plate engaged with the feeder drive chains.

FIG. 33 is an enlarged fragmentary plan view of the carton feeder illustrating its operation with a fresh supply of cartons.

FIG. 34 is an enlarged fragmentary plan view of the feeder illustrating its operation after the provision of additional cartons.

FIG. 35 is an enlarged fragmentary plan view of the feeder illustrating its operation immediately prior to the exhaustion of the carton supply.

FIG. 36 is a schematic diagram of the electrical switching circuitry for the machine.

Figure 12:
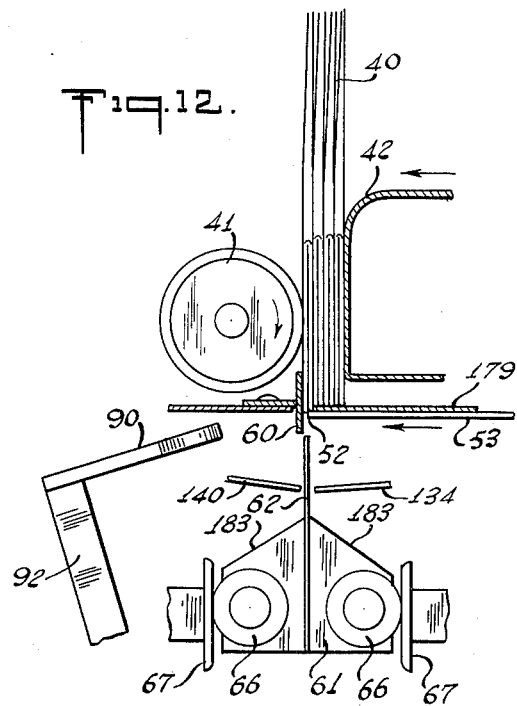
FIG. 12 is an enlarged fragmentary sectional view illustrating the carton feeder.

The cartons 40 (FIG. 1) in a flat folded form are urged toward feeder wheels 41 by pusher 42. Pusher 42 is advanced to move the cartons by means of feeder chain drive 43 which is engaged by latch handle 44. The drive to feed wheels 41 which are mounted on shaft 41a (FIG. 2) is provided by belt 45 driven by pulley 46 which passes over idler wheels 47 and 48. Pulley 46 is powered by main shaft 49 and drive gears 50 and 51. Feed wheels 41 are provided with a suitable surface such as rubber so that they may engage frictionally the cartons 40 in order to feed them into the machine.

The cartons are prevented from being fed through feeder opening 52 (FIG. 3) by the blocking action of feeder gates 53. Feeder gates 53 are advanced and retracted by actuator levers 54 which are mounted on shaft 55 and have slot 56 engaged with pin 57 on the feeder gates. Actuator levers 54 are operated by lever 58 which is attached to shaft 55 by set screw 55a and is restrained in a downward direction by spring 59. Upon the withdrawal of feeder gates 53 away from guide 60, feed wheels 41 forces carton 40 adjacent to it downwardly through feeder opening 52 toward the rising mandrel 61 containing plates 62.

Mandrel 61 is mounted upon support bracket 63 (FIG. 5) attached to rack 64 by screws 65. Mandrel 61 is provided with guide wheels 66 which contact guides 67 when mandrel 61 is in the upper region of its travel. Guide wheels 66 and guides 67 accurately align and support mandrel 61 with respect to feeder opening 52 so that the carton may descend and smoothly pass onto blades 62. Mandrel 61 is moved in a vertical direction by rack 64 (FIG. 4).

The drive to rack 64 originates with main shaft 49 upon which is mounted cam 68. Roller follower 69 is mounted upon shaft 70 which is secured to arm 71 by means of nut 72. The lower end of arm 71 contains slot 73 which engages journal 74 on main shaft 49. Link 75 which is pivotally attached to the upper end of arm 71 by screw 76 is disposed in a slot in gear 79. Upon positioning link 75 in the slot in gear 79, it is retained in place by bolt 78 extending through slot 77 in link 75 and attached to gear 79 by nut 80. Gear 79 is mounted upon shaft 81 which is secured to the frame members 82 and 83. Rotation of main shaft 49 and cam 68 imparts a rocking motion to arm 71 about the axis of feed drive shaft 49. The reciprocating motion of arm 71 swings link 75 attached thereto and causes gear 79 to rotate in a reciprocating manner determined by the profile of cam 68.

The motion of gear 79 is transmitted through pinion 84 (FIG. 10) attached to drive gear 85 in mesh with rack 64. In this way the prescribed reciprocating motion is imparted to rack 64 and thereby to mandrel 61. Rack 64 on support 64a is positioned by back plate 86 attached to frame member 87, guides 88a and b and retaining plates 89a and b.

Top pressure plate 90 (FIG. 3) extends from bracket 91 in a direction parallel to the longitudinal axis of mandrel 61. Bracket 91 is attached to arm 92 which is pivotally mounted on rack 93 by screw 94. Spring 95 bearing upon pin 96 in arm 92 urges arm 92 in a direction so as to maintain top pressure plate 90 normally away from the vertical plane of mandrel 61.

Cam 97 (FIG. 4) driven by main shaft 49 is engaged by roller follower 98 mounted upon shaft 99 which is secured to arm 100 by nut 101. The gearing and linkage associated with cam 97 (FIG. 6) is similar to that of cam 68. Arm 100 contains slot 102 which engages journal 103 of main drive shaft 49. Link 104 pivotally attached to arm 100 by screw 105 is disposed in a slot in gear 108. Upon positioning link 104 in the slot in gear 108, it is retained in place by bolt 107, extending through slot 106 in link 104 and attached to gear 108 by nut 109. The reciprocating motion imparted to gear 108 by the reciprocating motion of arm 100 is transmitted through pinion 110 and drive gear 111 to rack 93. Gear 108 is supported by shaft 81 while gears 85 and 111 are supported by shaft 112. Similarly to rack 64, rack 93 which is attached to support 93a is positioned with respect to frame member 87 by backing plate 113, guides 114a and b and retaining plates 115a and b.

Main shaft 49 is driven by motor 116 (FIG. 4) through sprockets 117 and 118 and drive chain 119. Mounted upon feed drive shaft 49 is cam 120. Engaged with cam 120 is roller follower 121 which is pivotally mounted in yoke 122 attached to push rod 123. Yoke 122 straddles journal 124 of main shaft 49 in order to position yoke 122 which is operated by the cam action. Push rod 123 (FIG. 3) is attached to connecting rod 125 which is guided by bearing 126 attached to plate 127. Connecting rod 125 is attached by pin 128 to link 129. Shaft 130 supported by bearings 131 is provided with arm 132 to which is connected link 129 by means of stud 133. Parting arms 134 (FIGS. 3 and 9) is fixed to shaft 130 by set screws 135. The reciprocating motion developed by cam 120 is transmitted through arm 132 to cause a swinging motion of arm 134.

The motion of shaft 130 is coupled to shaft 136 by the chain drive including sprockets 137 and 138 and chain 139 (FIG. 8). It is required that parting arm 140 move in a similar manner, but in the opposite direction to that of parting arm 134. This reversal in motion is generated by a crisscross layout (FIG. 7) of chain 139 upon idler sprockets 140 and 141 supported upon shaft 142. Main shaft 49 also serves to power feeder chain drive 43 by means of pulley 143. One flange of pulley 143 (FIG. 4) is provided with a threaded connection 144 to threaded hub 145 in order that the speed ratio of pulley 143 may be adjusted by varying the spacing of the pulley flanges. The drive to feeder chain drive 43 is made by means of belt 146.

Main shaft 49 (FIG. 10) operates cam 147 to control ejector lever 148. Link 149 pivoted on stud 150 carries roller follower 151 which is in contact with cam 147. The motion imparted to link 149 by cam 147 is transmitted through pivot 152 (FIG. 4) to rod end 153. Stud 150 is mounted in post 154 attached to the machine base 155 by screw 156. Rod end 157 is attached by pivot 158 to carton ejector lever 148 which is free to rotate about stud 160 passing through the lower end of the ejector lever. Stud 160 is mounted in bracket 161 attached to base 155. Spring 159 restrains lever 148 in a direction to pre-load roller follower 151 against cam 147. The drive to carton ejector lever 148 is transmitted from rod end 153 to rod end 157 between which is threaded adjusting sleeve 162, secured in place by lock nuts 163.

The carton to be erected is of the flat folded type described in U. S. Patent No. 1,768,023, granted June 24, 1930, to Leon Benoit. Carton 40 (FIG. 20) comprises inner side walls 164 extending from center fold line 165. Outer side walls 166 extend from intermediate fold lines 167 at the ends of the inner side walls. Inner side walls 164 and outer side walls 166 contain slots 166a and be respectively (FIG. 24), which are in register when carton 40 is in the flat folded form. Carton 40 contains a number of cross partitions 169 having bevel 170 and mouth 171 extending downwardly from upper surface 172 of cross partition 169 and terminating in slot 173. Projections 174 extend from upper surface 172 into mouths 171. Notches 175 extend inwardly from center fold line 165 and are in alignment with slots 168a. In flat folded form, cross partitions 169 extend through slots 168a and are pivotally supported by projections 174 engaged with notches 175 (FIG. 25). Extending upwardly from base edges 176 of cross partitions 169 are locking projections 177 which form notches 178. Carton 40 may be separated into two complete portions at its center by the provision of closely separated cross partitions 169a at the central area of carton 40. Inner side walls 164 and outer side walls 166 may be perforated to enable carton 40 to be conveniently separated into two complete portions.

The first step in the cycle of operation is shown in FIG. 12. Pusher 42 urges carton 40 into contact with feed wheels 41 and guide 60. The frictional forces of feed wheels 41 urge carton 40 in contact with the wheels in a downward direction. The carton is prevented from descending through feeder opening 52 by gates 53 which close the feeder opening. At this point, mandrel 61 is approaching its extreme upward position. Guide wheels 66 enter between guides 67 in order to align mandrel 61 with blades 62 beneath feeder opening 52. Lever 58 which is attached to actuator lever 54 by shaft 55 and set screw 55a is held in contact against support bracket 63 (FIG. 9) by the urging of spring 59. While mandrel 61 is nearing its uppermost position, support bracket 63 moves lever 58 upwardly thereby moving actuator lever 54 which withdraws feeder gates 53 away from guides 60. Top pressure plate 90 is held away from mandrel 61 by the force of spring 95. Parting arms 134 and 140 are nearly horizontal and blades 62 are disposed between the ends of the arms.

Figure 13:
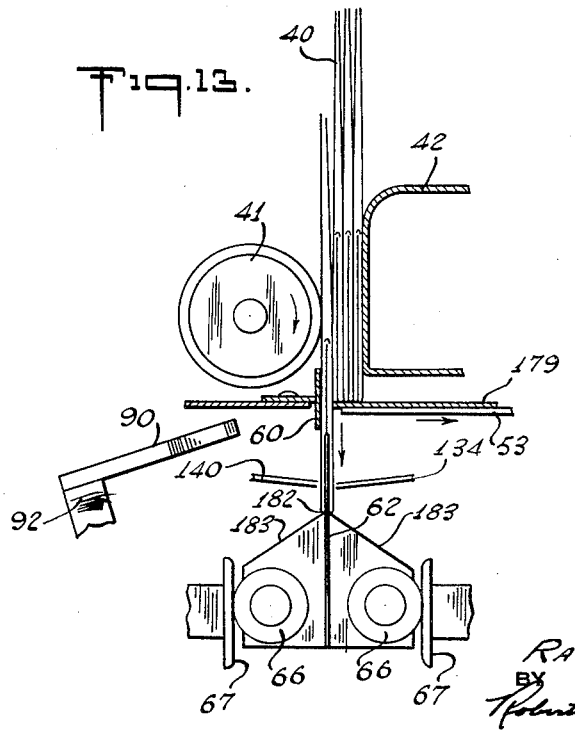
FIG. 13 is an enlarged fragmentary sectional view illustrating the placing of the carton upon the blades of the mandrel.

In FIG. 13 feeder gates 53 are withdrawn and feed wheels 41 are forcing carton 40 down upon blades 62 which pass within the narrow openings formed by the carton inner side walls and the cross partitions. The timing of feeder gates 53 and mandrel 61 is such that carton 40 descends upon blades 62 immediately prior to the termination of the upward motion of mandrel 61. Guide 60 enables carton 40 to descend smoothly and to be aligned with blades 62. Feeder gates 53 (FIG. 8) are positioned with respect to feeder floor 179 by screws 165 located within slots 166 in the feeder gates.

As shown in FIG. 14, mandrel 61 has begun its downward motion and guide wheels 66 have passed from contact with guides 67. The stiffness and resiliency of carton 40 maintain it tightly engaged with blades 62. Feed wheels 41 continue to force carton 40 against ridge 182 at the upper portion of mandrel 61. Sloping surfaces 183 extend downwardly and away from ridge 182. The tangential velocity of feed wheels 41 is greater than the linear velocity of mandrel 61 so that feed wheels 41 continue to urge carton 40 against ridge 182 even though mandrel 61 is moving downwardly. The descent of mandrel 61 and support bracket 63 causes motion of lever 58 and consequently actuator lever 54 so that feeder gates 53 begin to close toward descending carton 40. Feeder gates 53 contact the descending carton before it passes from within feeder opening 52, but the frictional force thereby induced is of a low order, since spring 59 applies only a moderate force to lever 58.

In FIG. 15, carton 40 has passed through feeder opening 52 and feeder gates 53 have returned to their closed position, thereby preventing the descent of the following carton as mandrel 61 continues to descend. Outer side walls 166 pass from between the ends of parting arms 134 and 140 and the weight and resiliency of outer side walls 166 cause them to swing away from one another. The positive downward movement of outer side walls 166 is accomplished by the movement of parting arms 134 and 140 through engagement with outer side walls 166. The downward movement of parting arms 134 is due to the motion of cam 120 and yoke 122 which is transmitted through push rod 123, connecting rod 125, link 129, arm 132 to shaft 130. Chain 139 (FIG. 7) transmits this motion in a reversed manner to shaft 136 and parting arm 140. The position of cam 120 on main shaft 49 serves to synchronize the movement of parting arms 134 with the descent of mandrel 61 which is also driven alternately by main shaft 49. As shown in FIG. 15, top pressure plate 90 remains withdrawn so that it will not interfere with the outward folding of outer side walls 166. Mandrel 61 is shown descending through the opening between guides 184 mounted upon plates 127.

In FIG. 16, parting arms 134 and 140 attached to shafts 130 and 136 respectively have folded outer side walls 166 beyond a flat position. As outer side walls 166 are folded flat, cross partitions 169 (FIG. 23) are no longer restrained by being enclosed between outer side walls 166 so that cross partitions 169 may pivot on projections 174 in notches 175 and assume the random positions shown. As shown in FIG. 16, top pressure plate 90 has been pivoted about screw 94 (FIG. 3) against the restraint of spring 95 by the interaction of cam surface 185 with cam 186, so that arm 92 is substantially vertical and pressure plate 90 is substantially horizontal. The descent of rack 93 to which pressure plate 90 is pivotally attached brings pressure plate 90 into engagement with center fold line 165. Pressure plate 90 forces center fold line 165 in a downward manner with the result that inner side walls 164 separate from one another at ridge 182 of mandrel 61 and intermediate fold lines 167 slide downwardly along sloping surfaces 183. The separation of inner side walls 164 causes slots 168a to contact cross partitions 169 and rotate the partitions with respect to center fold 165 until each partition is aligned with slots 168b (FIG. 24).

In FIG. 17, pusher plate 90 bears upon center fold line 165 and forces inner side walls 164 to spread along and conform to the profile of sloping surfaces 183 (FIG. 26) of mandrel 61. The erecting of the inner side walls 164 positions intermediate fold line 167 downwardly along sloping surfaces 183 with the result that outer side walls 166 contact and pivot upwardly about guides 184. Mandrel 61 remains stationary during this operation. With inner side walls 164 erected along mandrel 61, cross partitions 169 pass within slots 187 formed in the upper portion of mandrel 61. Slots 187 are of sufficient width to receive cross partitions 169 as they rotate from their initial position in which they are parallel to center wall line 165 until they reach their final transverse position.

As shown in FIG. 18, mandrel 61 has descended with pressure plate 90 holding carton 40 in place upon mandrel 61. Since parting arms 134 and 140 are clear of outer side walls 166 (FIG. 17), outer side walls 166 are free to fold inwardly due to their contact with guides 184 during the descent of carton 40. During the inward folding of outer side walls 166, slots 168b pass over locking projections 177 and engage with cross partitions 169. During the descent of mandrel 61, base edges 176 of cross partitions 169 are supported by engagement with platforms 188 which are mounted to slide with respect to walls 189 supported between ejector floor 190 and frame member 191. Platforms 188 are restrained in an upward manner by springs 192. In FIG. 18 carton ejector 193 is shown positioned adjacent to one side of platforms 188.

In FIG. 19, pusher plate 90 has forced carton 40 downwardly and results in the deflection of spring 192 attached to platforms 188. Outer side walls 166 contact walls 189 during the descent of carton 40. With carton 40 held against platforms 188 by the force of pressure plate 90, mandrel 61 is moved downwardly so that it is disengaged from carton 40. In this portion of the operating cycle, outer side walls 166 have passed beneath plates 127. Carton ejector 193 remains removed to one side of carton 40.

As shown in FIG. 20, pusher plate 90 advances upwardly thereby removing the downward force applied to carton 40 resting upon platforms 188. The forces of springs 192 are then free to elevate platforms 188 until they reach their full upward position which is in the plane of ejector floor 190. The upward travel of carton 40 causes the outward folding of outer side walls 166 which results in the seating of slots 168b in notches 178 of the cross partitions 169. This step completes the erection of carton 40 and carton ejector 193 begins to move toward carton 40 to push it onto ejector floor 190.

In FIG. 21 carton ejector 193 has pushed carton 40 away from platforms 188 and onto ejector floor 190. Erected cartons 40 may be removed from ejector floor 190 manually by the human operator or by exit conveyor 194 which passes over roller 195 driven by chain drive 196. Flights 197 on conveyor 194 engage cross partitions 169 and carry the erected carton 40 from the machine. Button switch 198 is actuated by switch arm 199 which is pivoted on shaft 200 and located in the line of travel of the erected cartons 40. Removal of a carton by the human operator or by an exit conveyor actuates button switch 198 which causes the machine to begin a new cycle of operation during which the next carton is erected. After the ejection of the erected carton 40, carton ejector 193 attached to lever 148 positioned by guides 201 (FIG. 4) is retracted (FIG. 21) by the action of cam 147 and its associated linkage.

The schematic diagram for the electrical circuitry of the machine is shown in FIG. 36. Connection is made to the power line at terminals 202a and b. The main line switch 203 must be placed in the closed position for operation of the machine. Switch unit 204 includes switches 205 and 206 which may be operated to cycle the machine over a fraction of its normal period of operation. The use of this switch unit 204 would be limited to operation for inspection and adjustment of the machine. Switch 205 is normally closed and connects terminal 202a to both normally open switch 206 and to line 207. Line 207 is connected to both push button switch 198 and to terminal 208a of relay 209. Line 210 connects the contact of switch 206 to the contact of switch 198 and also to terminal 211a of motor 116. Line 210 also leads to terminal 208b of relay 209 and to terminal 212a of switch 212. Terminal 212b of switch 212 is connected to control winding 213 of relay 209 and on to line 214 connecting terminal 211b of motor 116 to line terminal 202b.

In normal operation, switch 205 remains closed while switch 206 remains opened. The actuation of switch 198 occurs when a carton is removed from the machine and moves switch arm 199. The movement of switch arm 199 closes the circuit from terminal 202a through line 207 and switch 198 so as to energize line 210 which leads to terminal 211a of motor 116. The circuit from motors 116 is completed through terminal 211b and line 214 to line terminal 202b. The operation of motor 116 immediately positions cam 215 so that the contacts of switch 212 close. Upon their closure, line 210a is connected through terminal 212a, the switch contacts, and terminal 212b to energize control winding 213 of relay 209. The operation of relay 209 completes the circuit across terminals 208a and 208b so that motor 116 is energized by a direct path from line 207 through relay 209 and line 210a to terminal 211a. Operation of motor 116 through this path continues until cam 215 is driven to a position in which it opens switch 212 and thereby deenergizes relay 209 to complete the operating cycle.

In order to operate the machine over a limited portion of its complete cycle, switch 206 may be closed. Upon its closure, motor 116 is energized directly through line 210 until relay 209 is actuated, thereby completing the motor circuit through the terminals 208a and b and line 210a. Switch 206 need only be momentarily closed, since its operation will result in the actuation of relays 209 which will continue the operation of motor 116 until the cycle is terminated by cam 215 opening switch 212. If the operator wishes to stop operation in the midst of the cycle, switch 205 may be opened momentarily which will cause relay 209 to drop out and interrupt the cycle.

The drive to feeder chain 43 (FIG. 3) originates with pulleys 143 mounted on feeder drive shaft 49. Pulley 143 drives belt 146 which in turn drives pulley 215 (FIG. 5) mounted upon shaft 216 and supported by bearings 217. Attached to shaft 216 is worm 218 engaged with wheel 219 (FIGS. 3 and 5) mounted upon shaft 220 which is supported by bearings 221. Pulley 222 (FIG. 5) attached to shaft 220 drives belt 223 which drives pulley 224 (FIG. 8) attached to shaft 224a and supported in bearings 225. Drive sprockets 226 are attached to shaft 224a. Feeder drive chains 43 (FIG. 8) pass over sprockets 226 and idler sprockets 227 which are supported by shaft 228. Pusher 42 (FIG. 5) is supported by bearings 229 on shafts 230 which are mounted on feeder floor 179 by brackets 231 and 232 (FIG. 8). As shown in FIGS. 3 and 11, latch handle 44 is mounted in a sliding manner with respect to pusher 42. Stop 233 limits the movement of handle 44. The ends of latch handle 44 contain studs 234 which pass between the links of chains 43 so as to lock pusher 42 with respect to the chains in order to convey the pusher. Guides 43a furnish lateral support to chains 43.

In FIG. 30 a modification of the pusher is shown. The modification includes pusher plates 235 and 236 which are mounted on shaft 237 by sleeves 238 and 239 respectively. Pusher plates 235 and 236 have locks 240 and 241 respectively which may engage chains 43 to drive the pusher plates in the direction of feed (FIG. 32).

As shown in FIG. 33, cartons 40 are disposed between feed wheels 41 and pusher plate 235 as well as pusher 235 and pusher plate 236. During operation of the machine the cartons between the feeder wheels 41 and pusher plate 235 will be consumed and pusher plate 235 will approach feeder wheels 41. At this point, pusher plate 235 would be disengaged from chains 43 by rotation about shaft 237, thereby combining the two groups of cartons 40. Pusher plate 235 would then be moved to the rear of the combined group of cartons and placed in engagement with chains 43 immediately in front of pusher plate 236 (FIG. 34). Chains 43 would then continue to advance pusher plate 235, pusher plate 236, and cartons 40 in the direction of feed wheels 41, as shown in FIG. 35.

FIG. 27 shows a modification of mandrel 61. Mandrel 242 is mounted upon support bracket 243 which is attached to rack 64 (FIG. 29). Mandrel 242 is provided with ridge 244 from which extends sloping surfaces 245. Mandrel 242 is intersected by a plurality of slots 246. Extending from ridge 244 proximate to the ends of mandrel 242 are blades 247 which are adapted to pass into the openings formed by inner side walls 164 and cross partitions 169 of the carton 40 in the flat folded form.

As shown in FIG. 28, mandrel 242 contains pairs of carton guides 248 which extend through openings 249 in mandrel 242 adjacent to blades 247. At their lower ends, guides 248 are attached to spacer 250 by stud 251 which extends into slot 252 in lever link 253. Guides 248 are urged toward blades 247 by the force of springs 254 which may be of an arcuate form shaped from flat spring stock. The force of springs 254 toward guides 248 is adjusted by set screws 255, which contact springs 254. The ends of lever links 253 opposite the point of connection to blade 247 are pivotally attached by stud 256 to lever bracket 257 mounted beneath support bracket 243. Lever slide 258 is supported within slot 259 in mandrel 242 by lever bracket 257. Lever slide 258 is pivotally connected to lever links 253 by links 260. The end 261 of lever slide 258 contains roller follower 262 mounted upon shaft 263. As shown in FIG. 29, roller follower 262 is positioned between surfaces of cam 264 attached to retaining plate 89a.

When mandrel 242 nears its uppermost position, roller follower 262 is positioned by cam 264 toward rack 64 with the result that lever slide 258 is moved also toward rack 64. This motion shifts links 260 toward rack 64 and elevates the ends of links 253 containing slots 252. The elevation of slots 252 moves guides 248 upwardly with respect to blades 247. The guides are shown in the upward position in FIGS. 27 and 28. During the delivery of carton 40 to the mandrel (FIG. 13), guides 248 align carton 40 with blades 247 so that the carton will pass smoothly onto the blades. The gripping action of guides 248 upon outer side walls 166 due to the clamping forces of springs 254 assist the passage of carton 40 through feeder opening 52 as mandrel 242 descends. During the descent of mandrel 242, roller follower 262 (FIG. 27) passes from without the straight section 264a of cam 264 and enters sloping section 264b which leads away from the direction of rack 64. Sloping surface 264b causes roller follower 262 and lever slide 258 to move away from the direction of rack 64. The outward movement of lever slide 258 swings links 260 so that slots 252 in the ends of lever links 253 descend away from mandrel 242. The downward motion of slots 252 lowers guides 248 so that sloping surfaces 245 of mandrel 242 are accessible for the subsequent erection of carton 40.

As a further aid to the understanding of my invention, I shall now describe the preferred sequence of operating steps. Cartons 40 in the flat folded form are delivered along feeder floor 179 by the force of pusher 42 which is driven by feeder chains 43. The leading carton is advanced by pusher 42 into contact with guide 60 and feed wheels 41. By the upward movement of rack 64, mandrel 61 with its upwardly extending blades 62 is positioned beneath feeder opening 52 which is then covered by feeder gates 53. As blades 62 approach their uppermost position, feeder gates 53 are withdrawn away from guide 60 thereby permitting feed wheels 41 to push carton 40 through opening 52 and on to blades 62.

Mandrel 61, having reached its maximum upward position, begins to descend while feed wheels 41 continue to push carton 40 in the direction of descending mandrel 61. Before carton 40 passes beyond feeder opening 52 and guide 60, feeder gates 53 return toward their closed positions so as to prevent the release of the following carton. As mandrel 61 descends, outer side walls of carton 40 pass from between parting arms 134 and fold outwardly away from one another.

Parting arms 134 are then rotated to complete the downward folding of side walls 166 which releases cross partitions 169 to pivot in a random manner about projections 174 resting in notches 175. Pressure plate 90 descends upon center fold line 165 of carton 40 and urges carton 40 to separate upon sloping surfaces 183 of mandrel 61. The downward motion of pressure plate 90 swings inner side walls 154 outwardly, the slots 168a of which align cross partitions 169 with slots 168b.

Carton 40 is held against mandrel 61 which then descends, causing the inward folding of outer side walls 166 which are engaged with guides 134. The inward folding passes slots 168b over locking projections 177.

The support of carton 40 is then transferred to carton platforms 188 which are restrained by springs 192 and mandrel 61 is withdrawn from engagement with carton 40. The upward movement of pressure plate 90 permits springs 192 to elevate carton floors 188 and thus carton 40 so that outer side walls 166 are folded outwardly by contact with the under surface of plates 127. The outward folding sets lock 168b in notches 178 of cross partitions 169.

The erected carton 40 is then forced by ejector 193 to the exit station of the machine. At this point, the operating cycle is terminated.

The terms and expressions which I have employed are used in a descriptive and not in a limiting sense and I have no intention of excluding such equivalents of the invention described, or of portions thereof, as fall within the purview of the claims.

I claim:

1. In a machine for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the combination including means for separating the inner side walls of the carton through engagement with said inner side walls, means for folding the outer side walls outwardly about the intermediate fold lines, means for urging the carton against said separating means, means for holding the outer side walls inwardly, and means for supporting the carton through engagement with the cross partitions while said separating means is withdrawn.

2. A machine in accordance with claim 1 in which said separating means includes a mandrel having surfaces sloping away from a central ridge, said surfaces and central ridge being intersected by a plurality of slots disposed at right angles to said central ridge and adapted to receive the cross partitions of the erected carton, and a plurality of blade members being parallel to and extending from said ridge, said blade members being centrally disposed with respect to said surfaces and adapted to pass within the openings formed between the inner side walls and the cross partitions to position the flat folded carton with respect to the mandrel, and means for moving said mandrel during the erection of said carton.

3. A machine in accordance with claim 2 in which said mandrel includes guide members mounted on each side of said blade members for movement in planes parallel to said blade members and means for positioning said guide members with respect to said mandrel whereby said guide members contact the outer side walls of the carton during its placement upon said mandrel and are withdrawn beneath said sloping surfaces during the carton erection.

4. A machine in accordance with claim 2 in which said mandrel includes resilient guide members slideably mounted on each side of said blade members for movement in planes parallel to said blade members, cam linkage operated by the movement of said mandrel to position said resilient guide members with respect to said mandrel, whereby said guide members contact the outer side walls of the carton during its placement upon said mandrel and are withdrawn beneath said sloping surfaces during the carton erection.

5. A machine in accordance with claim 1 in which said means for folding the outer side walls outwardly about the intermediate fold lines includes arm members having a path of travel intersecting the side walls of the carton supported on said separating means, whereby said side walls are folded outwardly to a substantially flat position.

6. In a machine in accordance with claim 1 in which said means for urging the carton against said separating means includes a pressure plate overlying the carton center fold line and urging the carton through engagement with said center fold line, the carton being supported by said separating means, whereby the carton inner side walls are folded outwardly and the cross partitions positioned at right angles to the center fold line.

7. In a machine in accordance with claim 1, in which said means for folding said carton outer side walls inwardly, includes spaced folding bars engaging the carton outer side walls as said separating means and said urging means move the carton between said spaced folding bars.

8. In a machine in accordance with claim 1, means for supporting the carton through engagement with the cross partitions while said means for separating the carton is withdrawn including resiliently suspended plate members substantially parallel and at an interval from one another, said plate members moving in the direction of said separating means under the force of said urging means until said separating means is withdrawn from the carton and through said interval.

9. In a machine for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the combination including means for separating the inner side walls of the carton through engagement with said inner side walls, means for placing the carton onto said separating means, means for folding the outer side walls outwardly about the intermediate fold lines, means for urging the carton against said separating means, means for folding the outer side walls inwardly, and means for supporting the carton through engagement with the cross partitions while said separating means is withdrawn.

10. A machine in accordance with claim 9 in which said separating means includes a mandrel having surfaces sloping away from a central ridge, said surface and central ridge being intersected by a plurality of slots disposed at right angles to said central ridge and adapted to receive the cross partitions of the erected carton, and a plurality of blade members being parallel to and extending from said ridge, said blade members being centrally disposed with respect to said surfaces and adapted to pass within the opening formed between the inner side walls and the cross partitions to position the flat folded carton with respect to the mandrel and means to move said mandrel during the erection of said carton.

11. A machine in accordance with claim 10 in which said mandrel includes guide members mounted on each side of said blade members for movement in planes parallel to said blade members and means for positioning said guide members with respect to said mandrel whereby said guide members contact the outer side walls of the carton during its placement upon said mandrel and are withdrawn beneath said sloping surfaces during the carton erection.

12. A machine in accordance with claim 10 in which said mandrel includes resilient guide members slideably mounted on each side of said blade members for movement in planes parallel to said blade members, cam linkage operated by the movement of said mandrel to position said resilient guide members with respect to said mandrel, whereby said guide members contact the outer side walls of the carton during its placement upon said mandrel and are withdrawn beneath said sloping surfaces during the carton erection.

13. A machine in accordance with claim 9 in which means for placing the carton onto said separating means includes a carton magazine, said magazine having a slot aligned with said separating means, gate means disposed across said slot, means for feeding the flat folded carton toward said separating means, and means for alternately positioning said gate means to open said slot and to release said flat folded carton being fed toward said separating means.

14. A machine in accordance with claim 13 in which said means for feeding the flat folded cartons toward said separating means includes wheels being disposed adjacent to said slot and rotating in engagement with the flat folded carton in said magazine adjacent said slot, whereby the friction force of said wheels feeds the carton through said slot toward said separating means.

15. A machine in accordance with claim 9 in which said means for folding the outer side walls outwardly about the intermediate fold lines includes arm members having a path of travel intersecting the side walls of the carton, said carton being supported on said separating means, whereby said side walls are outwardly folded to a substantially flat position.

16. In a machine in accordance with claim 9 in which said means for urging the carton against said separating means includes a pressure plate overlying the carton center fold line and urging the carton through engagement with said center fold line, the carton being supported by said separating means, whereby the carton inner side walls are folded outwardly and the cross partitions positioned at right angles to the center fold line.

17. In a machine in accordance with claim 9 in which said means for folding said carton outer side walls inwardly includes spaced folding bars engaging the carton outer side walls as said separating means and said urging means move the carton between said spaced folding bars.

18. In a machine in accordance with claim 9, means for supporting the carton through engagement with the cross partitions while said means for separating the carton is withdrawn including resiliently suspended plate members subtsantially parallel and at an interval from one another, said plate members moving in the direction of said separating means under the force of said urging means until said separating means is withdrawn from the carton and through said interval.

19. In a machine for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the combination including means for separating the inner side walls of the carton through engagement with said inner side walls, means for placing the flat folded carton onto said separating means, means for folding the outer side walls outwardly about the intermediate fold lines, means for urging the carton against said separating means, means for folding said outer side walls inwardly, means for supporting the carton through engagement with the cross partitions while said separating means is withdrawn, and means for deflecting the outer side walls outwardly to seat the outer side wall slots with the cross partitions.

20. A machine in accordance with claim 19 in which said separating means includes a mandrel having surfaces sloping away from a central ridge, said surface and central ridge being intersected by a plurality of slots disposed at right angles to said central ridge and adapted to receive the cross partitions of the erected carton, and a plurality of blade members being parallel to and extending from said ridge, said blade members being centrally disposed with respect to said surfaces and adapted to pass within the opening formed between the inner side walls and the cross partitions to position the flat folded carton with respect to the mandrel and means to move said mandrel during the erection of said carton.

21. A machine in accordance with claim 20 in which said mandrel includes guide members mounted on each side of said blade members for movement in planes parallel to said blade members and means for positioning said guide members with respect to said mandrel whereby said guide members contact the outer side walls of the carton during its placement upon said mandrel and are withdrawn beneath said sloping surfaces during the carton erection.

22. A machine in accordance with claim 20 in which said mandrel includes resilient guide members slideably mounted on each side of said blade members for movement in planes parallel to said blade members, cam linkage operated by the movement of said mandrel to position said resilient guide members with respect to said mandrel, whereby said guide members contact the outer side walls of the carton during its placement upon said mandrel and are withdrawn beneath said sloping surfaces during the carton erection.

23. A machine in accordance with claim 19 in which means for placing the carton onto said separating means includes a carton magazine, said magazine having a slot aligned with said separating means, gate means disposed across said slot, means for feeding the flat folded carton toward said separating means, and means for alternately positioning said gate means to open said slot and to release said flat folded carton being fed toward said separating means.

24. A machine in accordance with claim 23 in which said means for feeding the flat folded cartons toward said separating means includes wheels being disposed adjacent to said slot and rotating in engagement with the flat folded carton in said magazine adjacent said slot, whereby the friction force of said wheels feeds the carton through said slot toward said separating means.

25. A machine in accordance with claim 19 in which said means for folding the outer side walls outwardly about the intermediate fold lines includes arm members having a path of travel intersecting the side walls of the carton, said carton being supported on said separating means, whereby said side walls are outwardly folded to a substantially flat position.

26. In a machine in accordance with claim 19 in which said means for urging the carton against said separating means includes a pressure plate overlying the carton center fold line and urging the carton through engagement with said center fold line, the carton being supported by said separating means, whereby the carton inner side walls are folded outwardly and the cross partitions positioned at right angles to the center fold line.

27. In a machine in accordance with claim 19 in which said means for folding said carton outer side walls inwardly, includes spaced folding bars engaging the carton outer side walls as said separating means and said urging means move the carton between said spaced folding bars.

28. In a machine in accordance with claim 19, means for supporting the carton through engagement with the cross partitions while said means for separating the carton is withdrawn including resiliently suspended plate members substantially parallel and at an interval from one another, said plate members moving in the direction of said separating means under the force of said urging means until said separating means is withdrawn from the carton and through said interval.

29. A machine in accordance with claim 19 in which said means for deflecting the outer side walls outwardly includes spaced folding plates extending outwardly from said means for folding said carton outer side walls inwardly, whereby said plates, through engagement with the outer side walls, deflect the side walls when said means for supporting the carton through engagement with the cross partitions moves the carton toward said plates.

30. In a machine for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the combination including means for separating the inner side walls of the carton through engagement with said inner side walls, means for placing the flat folded carton onto said separating means, means for folding the outer side walls outwardly about the intermediate fold lines, means for urging the carton against said separating means, means for folding said carton outer side walls inwardly, means for supporting the carton through engagement with the cross partitions while the means for separating the carton is withdrawn, means for deflecting the carton outer side walls outwardly to seat said outer side wall slots with said cross partitions, and means for ejecting the carton from said means for supporting the carton through engagement with the cross partitions.

31. A machine in accordance with claim 30 in which said separating means includes a mandrel having surfaces sloping away from a central ridge, said surface and central ridge being intersected by a plurality of slots disposed at right angles to said central ridge and adapted to receive the cross partitions of the erected carton, and a plurality of blade members being parallel to and extending from said ridge, said blade members being centrally disposed with respect to said surfaces and adapted to pass within the opening formed between the inner side walls and the cross partitions to position the flat folded carton with respect to the mandrel and means to move said mandrel during the erection of said carton.

32. A machine in accordance with claim 31 in which said mandrel includes guide members mounted on each side of said blade members for movement in planes parallel to said blade members and means for positioning said guide members with respect to said mandrel whereby said guide members contact the outer side walls of the carton during its placement upon said mandrel and are withdrawn beneath said sloping surfaces during the carton erection.

33. A machine in accordance with claim 31 in which said mandrel includes resilient guide members slideably mounted on each side of said blade members for movement in planes parallel to said blade members, cam linkage operated by the movement of said mandrel to position said resilient guide members with respect to said mandrel, whereby said guide members contact the outer side walls of the carton during its placement upon said mandrel and are withdrawn beneath said sloping surfaces during the carton erection.

34. A machine in accordance with claim 30 in which means for placing the carton onto said separating means includes a carton magazine, said magazine having a slot aligned with said separating means, gate means disposed across said slot, means for feeding the flat folded carton toward said separating means, and means for alternately positioning said gate means to open said slot and to release said flat folded carton being fed toward said separating means.

35. A machine in accordance with claim 34 in which said means for feeding the flat folded cartons toward said separating means includes wheels being disposed adjacent to said slot and rotating in engagement with the flat folded carton in said magazine adjacent said slot, whereby the friction force of said wheels feeds the carton through said slot toward said separating means.

36. A machine in accordance with claim 30 in which said means for folding the outer side walls outwardly about the intermediate fold lines includes arm members having a path of travel intersecting the side walls of the carton, said carton being supported on said separating means, whereby said side walls are outwardly folded to a substantially flat position.

37. In a machine in accordance with claim 30 in which said means for urging the carton against said separating means includes a pressure plate overlying the carton center fold line and urging the carton through engagement with said center fold line, the carton being supported by said separating means, whereby the carton inner side walls are folded outwardly and the cross partitions positioned at right angles to the center fold line.

38. In a machine in accordance with claim 30 in which said means for folding said carton outer side walls inwardly includes spaced folding bars engaging the carton outer side walls as said separating means and said urging means move the carton between said spaced folding bars.

39. In a machine in accordance with claim 30 means for supporting the carton through engagement with the cross partitions while said means for separating the carton is withdrawn including resiliently suspended plate members substantially parallel and at an interval from one another, said place members moving in the direction of said separating means under the force of said urging means until said separating means is withdrawn from the carton and through said interval.

40. A machine in accordance with claim 30 in which said means for deflecting the outer side walls outwardly includes spaced folding plates extending outwardly from said means for folding said carton outer side walls inwardly, whereby said plates through engagement with the outer side walls, deflect the side walls when said means for supporting the carton through engagement with the cross partitions moves the carton toward said plates.

41. In a machine in accordance with claim 30 in which said means for ejecting the carton from the machine includes a pusher member and means to move said pusher member in a path at right angles to and across the path of motion of said supporting means, beneath said means for deflecting the outer side walls to urge the carton from said means for supporting the carton through engagement with the cross partitions upon completion of erection of the carton.

42. The method of erecting a flat folded carton having inner side walls extending from a center fold line to intermediate fold lines, outer side walls extending from the intermediate fold lines over the inner side walls the inner and outer side walls containing registering transverse slots, and cross partitions hinged in the slots of the inner side walls and lying flat between the inner and outer side walls which comprises the steps of separating the inner side walls of the carton through engagement with said inner side walls, folding the outer side walls outwardly about the intermediate fold lines, urging the carton against the separating means, folding the carton outer side walls inwardly, and supporting the carton along the cross partitions as the separating means is withdrawn.

43. The method of erecting a flat folded carton having inner side walls extending from a center fold line to intermediate fold lines, outer side walls extending from the intermediate fold lines over the inner side walls, the inner and outer side walls containing registering transverse slots, and cross partitions hinged in the slots of the innerside walls and lying flat between the inner and outer side walls which comprises the steps of placing the carton on means for separating the inner side walls of the carton through engagement with said inner side walls, separating the inner side walls, folding the outer side walls outwardly about the intermediate fold lines, urging the carton against the separating means, folding the carton outer side walls inwardly, and supporting the carton along the cross partitions as the separating means is withdrawn.

44. The method of erecting a flat folded carton having inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls which comprises the steps of placing the carton on means for separating the inner side walls of the carton through engagement with said inner side walls, separating the inner side walls, folding the outer side walls outwardly about the intermediate fold lines, urging the carton against the separating means, folding the carton outer side walls inwardly, supporting the carton along the cross partitions as the support along the carton inner side walls is removed, and deflecting the outer side walls outwardly to seat the side wall slots with the cross partitions.

45. The method of erecting a flat folded carton having inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls which comprises the steps of placing the carton on means for separating the inner side walls of the carton through engagement with said inner side walls, separating the inner side walls, folding the outer side walls outwardly about the intermediate fold lines, urging the carton against the separating means, folding the carton outer side walls inwardly, supporting the carton along the cross partitions as the support along the carton inner side walls is removed, deflecting the outer side walls outwardly to seat the side wall slots with the cross partitions and ejecting the erected carton.

References Cited in the file of this patent

UNITED STATES PATENTS

| | | |
|---|---|---|
| 2,024,201 | Benoit et al. | Dec. 17, 1935 |
| 2,826,967 | Hatcher | Mar. 18, 1958 |

UNITED STATES PATENT OFFICE

CERTIFICATE OF CORRECTION

Patent No. 3,049,060　　　　　　　　　　　　August 14, 1962

Raymond Vahle

It is hereby certified that error appears in the above numbered patent requiring correction and that the said Letters Patent should read as corrected below.

Column 10, line 70, for "holding" read -- folding --; column 12, line 71, for "subtsantially" read -- substantially --; column 15, line 51, for "place" read -- plate --.

Signed and sealed this 19th day of February 1963.

(SEAL)
Attest:

EASTON G. JOHNSON
Attesting Officer

DAVID L. LADD
Commissioner of Patents